United States Patent
Akiya

(10) Patent No.: US 8,411,114 B2
(45) Date of Patent: Apr. 2, 2013

(54) IMAGE DISPLAY DEVICE, AND PROGRAM PRODUCT FOR DISPLAYING IMAGE

(75) Inventor: Hiroyuki Akiya, Tokyo (JP)

(73) Assignee: Nikon Corporation, Tokyo (JP)

( * ) Notice: Subject to any disclaimer, the term of this patent is extended or adjusted under 35 U.S.C. 154(b) by 713 days.

(21) Appl. No.: 12/450,322

(22) PCT Filed: Mar. 26, 2008

(86) PCT No.: PCT/JP2008/055728
§ 371 (c)(1),
(2), (4) Date: Dec. 23, 2009

(87) PCT Pub. No.: WO2008/117827
PCT Pub. Date: Oct. 2, 2008

(65) Prior Publication Data
US 2010/0164992 A1 Jul. 1, 2010

(30) Foreign Application Priority Data
Mar. 26, 2007 (JP) .................................. 2007-079155

(51) Int. Cl.
*G09G 5/377* (2006.01)
(52) U.S. Cl. ........ 345/641; 345/629; 345/634; 715/202; 715/204; 715/253; 715/255
(58) Field of Classification Search .................. 345/629, 345/634, 641; 715/202, 204, 253, 255
See application file for complete search history.

(56) References Cited

U.S. PATENT DOCUMENTS

| 6,623,528 | B1 * | 9/2003 | Squilla et al. ................. 715/202 |
| 6,727,909 | B1 | 4/2004 | Matsumura et al. |
| 2001/0035875 | A1 * | 11/2001 | Suzuki et al. ................. 345/723 |
| 2002/0040375 | A1 | 4/2002 | Simon et al. |
| 2006/0279555 | A1 * | 12/2006 | Ono ............................. 345/173 |

FOREIGN PATENT DOCUMENTS

| JP | A-3-274047 | 12/1991 |
| JP | A-10-293838 | 11/1998 |
| JP | A-2006-74590 | 3/2006 |

* cited by examiner

*Primary Examiner* — Xiao M. Wu
*Assistant Examiner* — Todd Buttram
(74) *Attorney, Agent, or Firm* — Oliff & Berridge, PLC

(57) ABSTRACT

The image display device includes: a storage unit that stores a plurality of templates for image arrangement a setting unit that sets a number of arrangement subject images; an image selection unit that selects the arrangement subject images from among photographic images; a decision unit that makes a decision as to whether or not the orientations of the selected arrangement subject images are portrait format or landscape format; a template selection unit that selects a subject template from among the plurality of templates stored in the storage unit, on the basis of the number of images to be arranged and the decision result by the decision unit; a creation unit that creates an image for display by arranging the arrangement subject images in the image arrangement regions within the selected subject template; and a display control unit that displays the created image upon a display device.

12 Claims, 31 Drawing Sheets

FIG.7
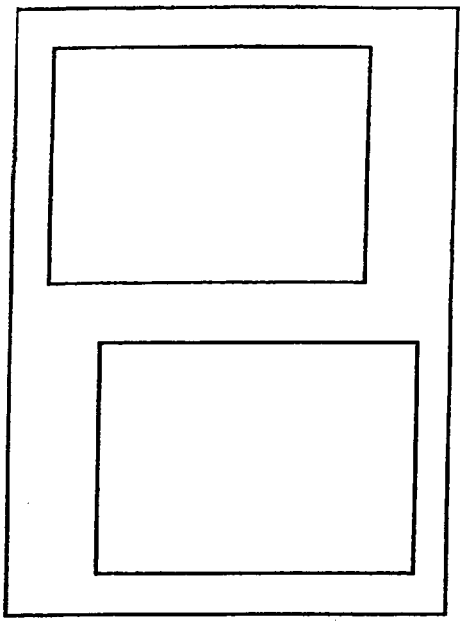
(a) 2-HH
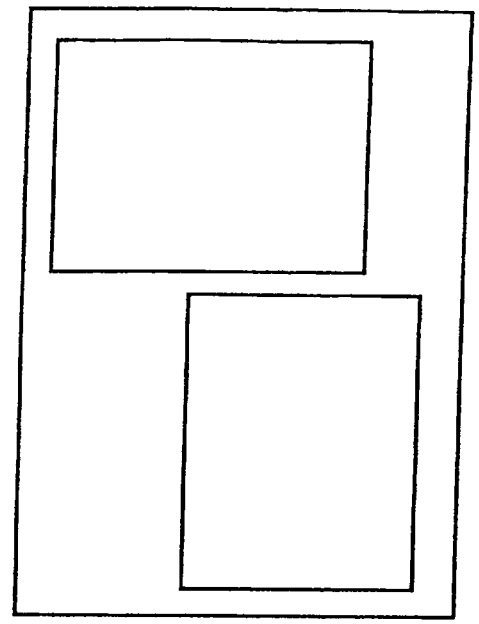
(b) 2-HV
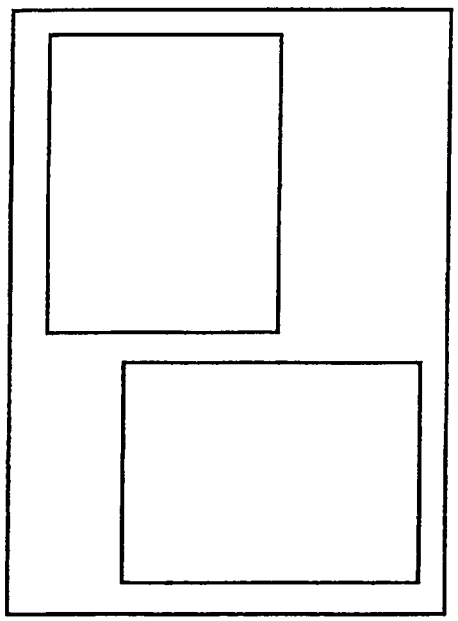
(c) 2-VH
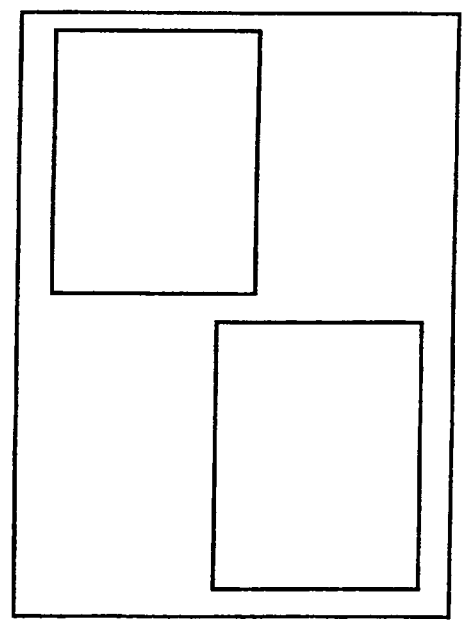
(d) 2-VV (a) 2-HH    (b) 2-HV    (c) 2-VH    (d) 2-VV (a) 2-HH    (b) 2-HV    (c) 2-VH    (d) 2-VV FIG.10
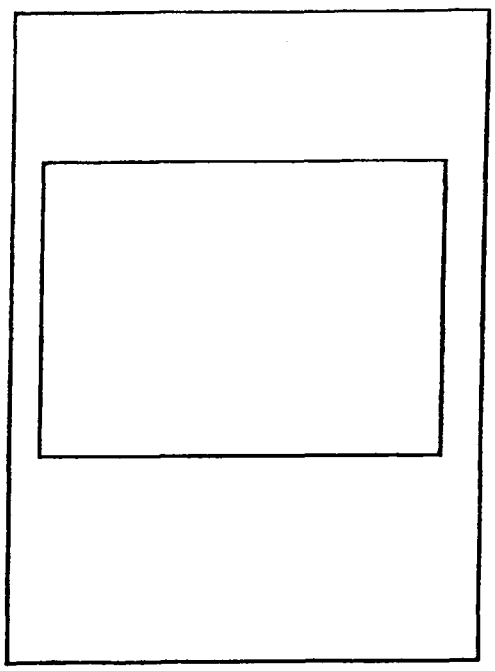
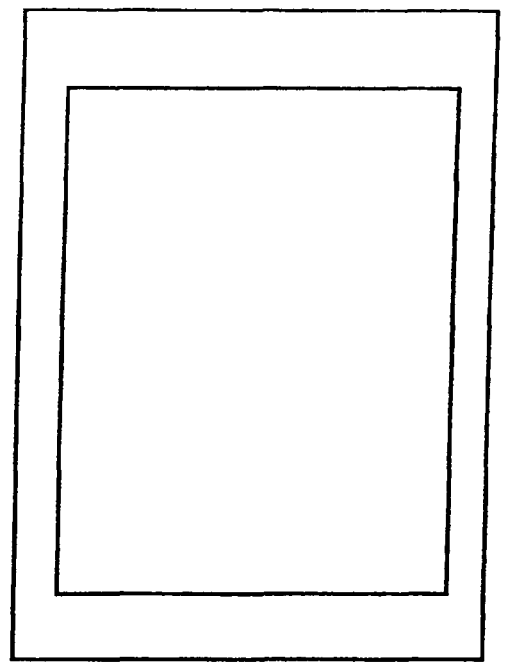
(a) 1-H    (b) 1-V

FIG.19

| IMAGE ARRANGEMENT | PAGE LAYOUT SELECTION |
|---|---|
| A4 PORTRAIT: ONE ON LEFT PAGE (PORTRAIT) | / ONE ON RIGHT PAGE (PORTRAIT) |
| A4 PORTRAIT: ONE ON LEFT PAGE (PORTRAIT) | / ONE ON RIGHT PAGE (LANDSCAPE) |
| A4 PORTRAIT: ONE ON LEFT PAGE (LANDSCAPE) | / ONE ON RIGHT PAGE (PORTRAIT) |
| A4 PORTRAIT: ONE ON LEFT PAGE (LANDSCAPE) | / ONE ON RIGHT PAGE (LANDSCAPE) |
| A4 PORTRAIT: ONE ON LEFT PAGE (PORTRAIT) | / TWO ON RIGHT PAGE (PORTRAIT, PORTRAIT) |
| A4 PORTRAIT: ONE ON LEFT PAGE (PORTRAIT) | / TWO ON RIGHT PAGE (PORTRAIT, LANDSCAPE) |
| A4 PORTRAIT: ONE ON LEFT PAGE (PORTRAIT) | / TWO ON RIGHT PAGE (LANDSCAPE, PORTRAIT) |
| A4 PORTRAIT: ONE ON LEFT PAGE (PORTRAIT) | / TWO ON RIGHT PAGE (LANDSCAPE, LANDSCAPE) |
| A4 PORTRAIT: ONE ON LEFT PAGE (LANDSCAPE) | / TWO ON RIGHT PAGE (PORTRAIT, PORTRAIT) |
| A4 PORTRAIT: ONE ON LEFT PAGE (LANDSCAPE) | / TWO ON RIGHT PAGE (PORTRAIT, LANDSCAPE) |
| A4 PORTRAIT: ONE ON LEFT PAGE (LANDSCAPE) | / TWO ON RIGHT PAGE (LANDSCAPE, PORTRAIT) |
| A4 PORTRAIT: ONE ON LEFT PAGE (LANDSCAPE) | / TWO ON RIGHT PAGE (LANDSCAPE, LANDSCAPE) |
| A4 PORTRAIT: TWO ON LEFT PAGE (PORTRAIT, PORTRAIT) | / ONE ON RIGHT PAGE (PORTRAIT) |
| A4 PORTRAIT: TWO ON LEFT PAGE (PORTRAIT, PORTRAIT) | / ONE ON RIGHT PAGE (LANDSCAPE) |
| A4 PORTRAIT: TWO ON LEFT PAGE (PORTRAIT, LANDSCAPE) | / ONE ON RIGHT PAGE (PORTRAIT) |
| A4 PORTRAIT: TWO ON LEFT PAGE (PORTRAIT, LANDSCAPE) | / ONE ON RIGHT PAGE (LANDSCAPE) |
| A4 PORTRAIT: TWO ON LEFT PAGE (LANDSCAPE, PORTRAIT) | / ONE ON RIGHT PAGE (PORTRAIT) |
| A4 PORTRAIT: TWO ON LEFT PAGE (LANDSCAPE, PORTRAIT) | / ONE ON RIGHT PAGE (LANDSCAPE) |
| A4 PORTRAIT: TWO ON LEFT PAGE (LANDSCAPE, LANDSCAPE) | / ONE ON RIGHT PAGE (PORTRAIT) |
| A4 PORTRAIT: TWO ON LEFT PAGE (LANDSCAPE, LANDSCAPE) | / ONE ON RIGHT PAGE (LANDSCAPE) |
| A4 PORTRAIT: TWO ON LEFT PAGE (PORTRAIT, PORTRAIT) | / TWO ON RIGHT PAGE (PORTRAIT, PORTRAIT) |
| A4 PORTRAIT: TWO ON LEFT PAGE (PORTRAIT, PORTRAIT) | / TWO ON RIGHT PAGE (PORTRAIT, LANDSCAPE) |
| A4 PORTRAIT: TWO ON LEFT PAGE (PORTRAIT, PORTRAIT) | / TWO ON RIGHT PAGE (LANDSCAPE, PORTRAIT) |
| A4 PORTRAIT: TWO ON LEFT PAGE (PORTRAIT, PORTRAIT) | / TWO ON RIGHT PAGE (LANDSCAPE, LANDSCAPE) |
| A4 PORTRAIT: TWO ON LEFT PAGE (PORTRAIT, LANDSCAPE) | / TWO ON RIGHT PAGE (PORTRAIT, PORTRAIT) |
| A4 PORTRAIT: TWO ON LEFT PAGE (PORTRAIT, LANDSCAPE) | / TWO ON RIGHT PAGE (PORTRAIT, LANDSCAPE) |
| A4 PORTRAIT: TWO ON LEFT PAGE (PORTRAIT, LANDSCAPE) | / TWO ON RIGHT PAGE (LANDSCAPE, PORTRAIT) |
| A4 PORTRAIT: TWO ON LEFT PAGE (PORTRAIT, LANDSCAPE) | / TWO ON RIGHT PAGE (LANDSCAPE, LANDSCAPE) |
| A4 PORTRAIT: TWO ON LEFT PAGE (LANDSCAPE, PORTRAIT) | / TWO ON RIGHT PAGE (PORTRAIT, PORTRAIT) |
| A4 PORTRAIT: TWO ON LEFT PAGE (LANDSCAPE, PORTRAIT) | / TWO ON RIGHT PAGE (PORTRAIT, LANDSCAPE) |
| A4 PORTRAIT: TWO ON LEFT PAGE (LANDSCAPE, PORTRAIT) | / TWO ON RIGHT PAGE (LANDSCAPE, PORTRAIT) |
| A4 PORTRAIT: TWO ON LEFT PAGE (LANDSCAPE, PORTRAIT) | / TWO ON RIGHT PAGE (LANDSCAPE, LANDSCAPE) |
| A4 PORTRAIT: TWO ON LEFT PAGE (LANDSCAPE, LANDSCAPE) | / TWO ON RIGHT PAGE (PORTRAIT, PORTRAIT) |
| A4 PORTRAIT: TWO ON LEFT PAGE (LANDSCAPE, LANDSCAPE) | / TWO ON RIGHT PAGE (PORTRAIT, LANDSCAPE) |
| A4 PORTRAIT: TWO ON LEFT PAGE (LANDSCAPE, LANDSCAPE) | / TWO ON RIGHT PAGE (LANDSCAPE, PORTRAIT) |
| A4 PORTRAIT: TWO ON LEFT PAGE (LANDSCAPE, LANDSCAPE) | / TWO ON RIGHT PAGE (LANDSCAPE, LANDSCAPE) |

IMAGE SIZE:  ○LARGE  ⊙MEDIUM  ○SMALL

[ OK ]    [ CANCEL ]

IMAGE DISPLAY DEVICE, AND PROGRAM PRODUCT FOR DISPLAYING IMAGE

TECHNICAL FIELD

The present invention relates to an image display device for displaying an image, and to a program product for displaying an image.

BACKGROUND ART

The following type of image editing device is known. This image editing device is one that arranges images upon a page by performing calculation on the basis of the aspect ratios of the images to be thus arranged upon the page and the number of images to be arranged, and by determining the positions for arrangement of the images and the sizes at which they are to be disposed, so that the images do not overlap one another (refer to Patent Document #1).

Patent Document #1: Japanese Laid-Open Patent Publication H10-293838.

DISCLOSURE OF THE INVENTION

Problems to be Solved by the Invention

However, according to such a prior art device, since the layout of the page is determined according to the results of calculation when creating the page, there has been the possibility that the arrangement of the images may become one that is contrary to the intention of the user.

Means for Solving the Problems

The image display device according to a 1st aspect of the present invention comprises: a storage unit that stores a plurality of templates for image arrangement, each of which includes at least one of a portrait format arrangement region for arranging a portrait format image, and a landscape format image arrangement region for arranging a landscape format image; a number of images to be arranged setting unit that sets a number of arrangement subject images (i.e. a number of images to be arranged) to be arranged within the template for image arrangement; an image selection unit that selects the arrangement subject images from among photographic images that have been photographed in advance; a decision unit that makes a decision as to whether or not the orientations of the arrangement subject images selected by the image selection unit are portrait format or landscape format; a template selection unit that selects a template for image arrangement, as a subject template to be used for arranging the arrangement subject images, from among the plurality of templates for image arrangement stored in the storage unit, on the basis of the number of images to be arranged set by the number of images to be arranged setting unit, and on the basis of the decision result by the decision unit; a creation unit that creates an image for display by arranging the arrangement subject images in the image arrangement regions within the subject template selected by the template selection unit; and a display control unit that displays the image for display created by the creation unit upon a display device.

The image display device according to a 2nd aspect of the present invention comprises: a storage unit that stores a plurality of templates for image arrangement, each of which includes at least one of a portrait format arrangement region for arranging a portrait format image, and a landscape format image arrangement region for arranging a landscape format image; a number of images to be arranged setting unit that sets a number of arrangement subject images (i.e. a number of images to be arranged) to be arranged within the template for image arrangement, and the orientations of the arrangement subject images; an image selection unit that selects the arrangement subject images from among photographic images that have been photographed in advance; a template selection unit that selects a template for image arrangement, as a subject template to be used for arranging the arrangement subject images, from among the plurality of templates for image arrangement stored in the storage unit, on the basis of the number of images to be arranged and the orientations, set by the number of images to be arranged setting unit; a decision unit that makes a decision as to whether or not the orientations of the arrangement subject images selected by the image selection unit are portrait format or landscape format; a creation unit that creates an image for display by arranging, within the image arrangement regions in the subject template selected by the template selection unit, the arrangement subject images whose orientations match, on the basis of the results of decision by the decision unit; and a display control unit that displays the image for display created by the creation unit upon a display device.

According to a 3rd aspect of the present invention, in the image display device of the 1st or 2nd aspect, it is preferable that, for each template set, the storage unit stores the templates for image arrangement grouped together with those for which the number of the image arrangement regions included therein is the same being in one set.

According to a 4th aspect of the present invention, in the image display device of the 3rd aspect, it is desirable that the template selection unit selects a template set as a subject template set, and selects the subject template from the subject template set, according to the number of images to be arranged set by the number of images to be arranged setting unit.

According to a 5th aspect of the present invention, it is preferred that: the image display device of the 4th aspect further comprises a number of images to be arranged change unit that changes the number of images to be arranged set by the number of images to be arranged setting unit; and, if the number of images to be arranged has been changed by the number of images to be arranged change unit, the template selection unit re-selects a template set as the subject template set, according to the number of images to be arranged after change.

According to a 6th aspect of the present invention, it is preferable that: the image display device of the 4th or 5th aspect further comprises a replacement image selection unit that selects a replacement image to be replaced for an arrangement subject image arranged in the image for display, from among those of the photographic images that are not arranged in the image for display (i.e. from among the not yet arranged images); the template selection unit re-selects the subject template from among the subject template set, on the basis of the orientation of the replacement image selected by the replacement images selection unit; and the creation unit re-creates the image for display by arranging the replacement image in the image arrangement region within the subject template re-selected by the template selection unit.

According to a 7th aspect of the present invention, in the image display device of any one of the 3rd through 6th aspects, it is desirable that the template set is grouped together while also taking into account the aspect ratios of the image arrangement regions.

According to an 8th aspect of the present invention, in the image display device of any one of the 3rd through 7th aspects, it is desirable that the template set is grouped together while also taking into account the sizes of the image arrangement regions.

According to a 9th aspect of the present invention, in the image display device of any one of the 1st through 8th aspects, it is preferable that the display control unit displays the images for display created by the creation unit upon the display device two side by side on left and right, in a double page spread format.

According to a 10th aspect of the present invention, in the image display device of any one of the 1st through 9th aspects, it is preferred that the image for display is an image showing a page included in an electronic album, or a slide show image displayed while playing a slide show.

According to an 11th aspect of the present invention, in the image display device of the 6th aspect, it is desirable that the display control unit displays upon the display device a screen that is divided into a first region for displaying the images for display, a second region for displaying an item to be operated by the user for receiving change of the number of images to be arranged, and a third region for displaying the not yet arranged images.

According to a 12th aspect of the present invention, it is preferable that: the image display device of the 11th aspect further comprises an image for display selection unit that selects the images for display, displayed in the first region; and the display control unit displays in the third region, as the not yet arranged images, only those of the photographic images whose orientations match those of the arrangement subject images arranged within the image for display selected by the image for display selection unit.

The computer program product for image display according to a 13th aspect of the present invention stores a program for image display for causing a computer to execute: a number of images to be arranged setting step of setting a number of arrangement subject images (i.e. a number of images to be arranged) to be arranged within a plurality of templates for image arrangement, each of which includes at least one of a portrait format arrangement region for arranging a portrait format image, and a landscape format image arrangement region for arranging a landscape format image; an image selection step of selecting the arrangement subject images from among photographic images that have been photographed in advance; a decision step of making a decision as to whether or not the orientations of the arrangement subject images selected by the image selection step are portrait format or landscape format; a template selection step of selecting a template for image arrangement, as a subject template to be used for arranging the arrangement subject images, from among the plurality of templates for image arrangement, on the basis of the number of images to be arranged set by the number of images to be arranged setting step, and on the basis of the decision result by the decision step; a creation step of creating an image for display by arranging the arrangement subject images in the image arrangement regions within the subject template selected by the template selection step; and a display control step of displaying the image for display created by the creation step upon a display device.

The computer program product for image display according to a 14th aspect of the present invention stores a program for image display for causing a computer to execute: a number of images to be arranged setting step of setting a number of arrangement subject images (i.e. a number of images to be arranged) to be arranged within a plurality of templates for image arrangement, each of which includes at least one of a portrait format arrangement region for arranging a portrait format image, and a landscape format image arrangement region for arranging a landscape format image, and setting the orientations of the arrangement subject images; an image selection step of selecting the arrangement subject images from among photographic images that have been photographed in advance; a template selection step of selecting a template for image arrangement, as a subject template to be used for arranging the arrangement subject images, from among the plurality of templates for image arrangement, on the basis of the number of images to be arranged set by the number of images to be arranged setting step, and on the basis of their orientations; a decision step of making a decision as to whether or not the orientations of the arrangement subject images selected by the image selection step are portrait format or landscape format; a creation step of creating an image for display by arranging, within the image arrangement regions in the subject template selected by the template selection step, the arrangement subject images whose orientations match, on the basis of the results of decision by the decision step; and a display control step of displaying the image for display created by the creation step upon a display device.

Advantageous Effect of the Invention

According to the present invention, it is possible for images to be arranged according to the intention of the user.

BRIEF DESCRIPTION OF THE DRAWINGS

FIG. 7 is a figure showing a concrete example of a template set that is used for arranging two images (of medium image size) upon one page;

FIG. 10 is a figure showing a concrete example of a template set that is used for arranging a single image upon one page;

FIG. 19 is a figure showing a concrete example of a screen for page layout selection, in a second embodiment;

BEST MODES FOR CARRYING OUT THE INVENTION

First Embodiment

Figure 1:
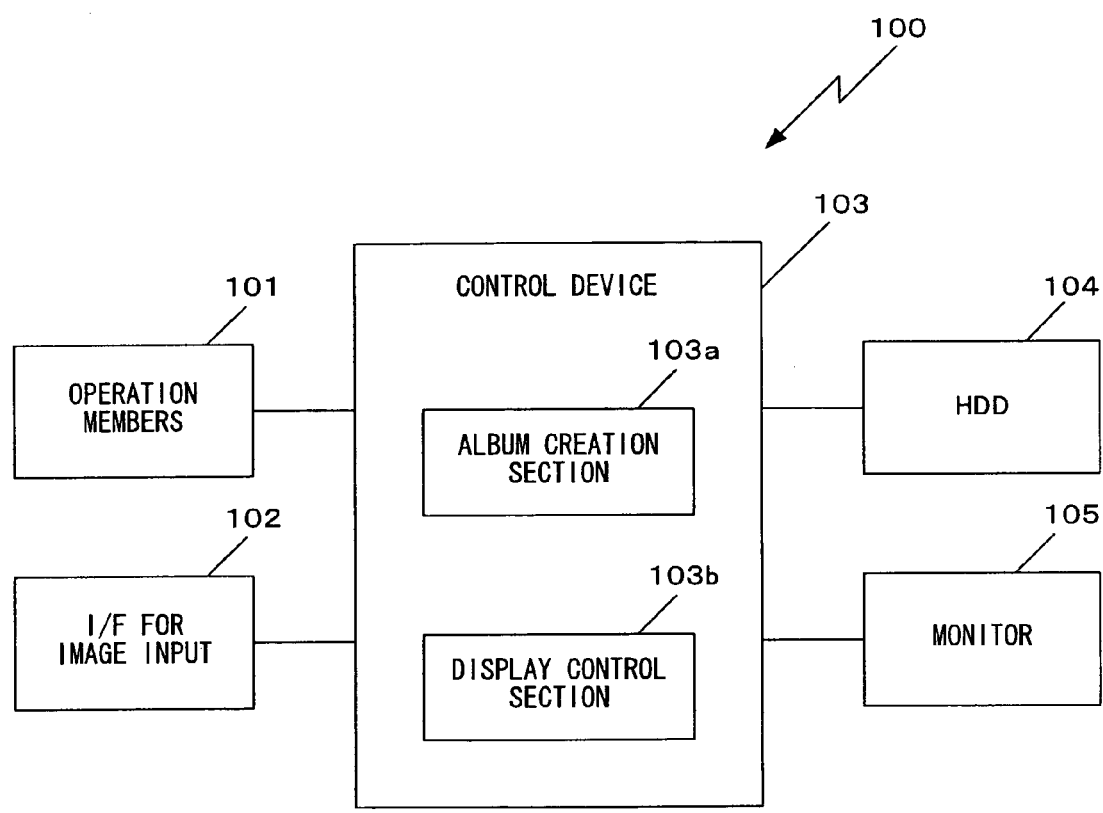
FIG. 1 is a block diagram showing the structure of an embodiment of an image display device.

FIG. 1 is a block diagram showing the structure of an embodiment of an image display device according to the first embodiment. For example, a personal computer may be used as this image display device 100. This image display device 100 includes operation members 101, an I/F (interface) for image input 102, a control device 103, a HDD (hard disk drive) 104, and a monitor 105.

The operation members 101 include input devices of various types that are actuated by the user, for example a keyboard and a mouse and so on.

The I/F for image input 102 is a connection interface for connecting an external image input device, for example a camera or the like. For example, a USB interface or a wireless LAN interface or the like may be used as this I/F for image input 102. The I/F for image input 102 acquires image data (image files) from an external image input device that has been connected, and outputs this image data to the control device 103.

It should be understood that, in this embodiment, it will be supposed that each item of the image data inputted via the I/F for image input 102 is an image file in the Exif format, and consists of an appended information section and an image data section. An image file in the Exif format includes, in its appended information section, appended information such as the photographic conditions of the image and image data for display and so on, and, in its image data section, includes the main image data, for example image data in the Jpeg format. The image data for display included in the appended information section is image data that has been created by shrinking down the main image data, such as, for example, image data for a thumbnail image and/or for a large thumbnail image.

Furthermore, data related to the orientation of the image (the image direction/image position) (i.e. image orientation data) is also included in the appended information section. In other words, some images are images in the landscape format (horizontal images) that the user has photographed by holding the camera in the horizontal orientation (i.e. positioned horizontally), for example images whose horizontal to vertical ratio is 4:3; while on the other hand, some images are images in the portrait format (vertical images) that he has photographed by holding the camera in the vertical orientation (i.e. positioned vertically), for example images whose horizontal to vertical ratio is 3:4. Accordingly, a sensor is provided to the camera for detecting the attitude of the camera during photography, and, each time an image is photographed by the camera, this image is classified as a horizontal image or a vertical image, according to the attitude of the camera at that time. And, when creating the image file, as image orientation data, information is recorded in the appended information section for distinguishing whether the image included in the image data section is a vertical image or a horizontal image.

For example, it would be acceptable to arrange for the image orientation data to be one byte of data that specifies a horizontal image by "0" and a vertical image by "1", and then an album creation section 103b that will be described hereinafter of the control device 103 will determine the orientation of the image by deciding whether the image orientation data included in the appended information section is "0" or "1". Or it would also be acceptable to record the horizontal size (i.e. the width) and the vertical size (i.e. the height) of the image as the image orientation data, and then the album creation section 103b that will be described hereinafter of the control device 103 will determine the orientation of the image on the basis of its horizontal size and vertical size. Moreover, other data formats for the image orientation data would also be acceptable.

Various types of data are recorded upon the HDD 104, such as image files that have been captured via the I/F for image input 102 and programs to be executed by the control device 103 as described hereinafter. For the monitor 105, for example, a liquid crystal display or the like may be used.

The control device 103 consists of a CPU, memory, and peripheral circuitry, and functionally includes a display control section 103a and an album creation section 103b. With the image display device of this embodiment, it is possible to create an album (an electronic album) in which image data captured via the I/F for image input 102 and recorded upon the HDD 104 is fitted to a predetermined format, and, when a command has been issued by the user for starting the creation of such an album, each element of the display control section 103a and the album creation section 103b executes processing as described hereinafter When, by actuation of the operation members 101, a command has been issued by the user for starting the creation of an album, the display control section 103a outputs the screen for image selection shown in FIG. 2 to the monitor 105 and displays it. This screen for image selection includes an image display region 2a, a "select folder" button 2b, and a "create album" button 2c. The display control section 103a reads in image files from within a predetermined folder upon the HDD 104, and displays the image data for display included in their appended information sections, for example large thumbnail images, within the image display region 2a.

It should be understood that the image files are read in from a default folder that is set in advance, but, by actuating an operation member 101 and selecting the "select folder" button 2b, the user is able to change the folder that is the source for reading in the images. If the folder to be the source for reading in images has been changed by the user, the display control section 103a reads in the image files within this folder after changing, and displays the image data for display included in their appended information sections as a list in the image display region 2a.

The user actuates an operation member 101 and selects, from within the image list displayed in the image display region 2a, those images that he wishes to include in an album (i.e. those images that are to be subjects for arrangement). Then, at the time point that this selection of images has been completed, he presses the "create album" button 2c. When the "create album" button 2c is pressed by the user, the display control section 103a outputs the screen for page layout selection shown in FIG. 3 to the monitor 105 and displays it. It should be understood that the user could also press the "create album" button 2c on the screen for image selection shown in FIG. 2, without having selected even a single image from within the image display region 2a. In this case, a blank page is displayed upon a screen for album editing, described hereinafter with reference to FIG. 12.

Figure 3:
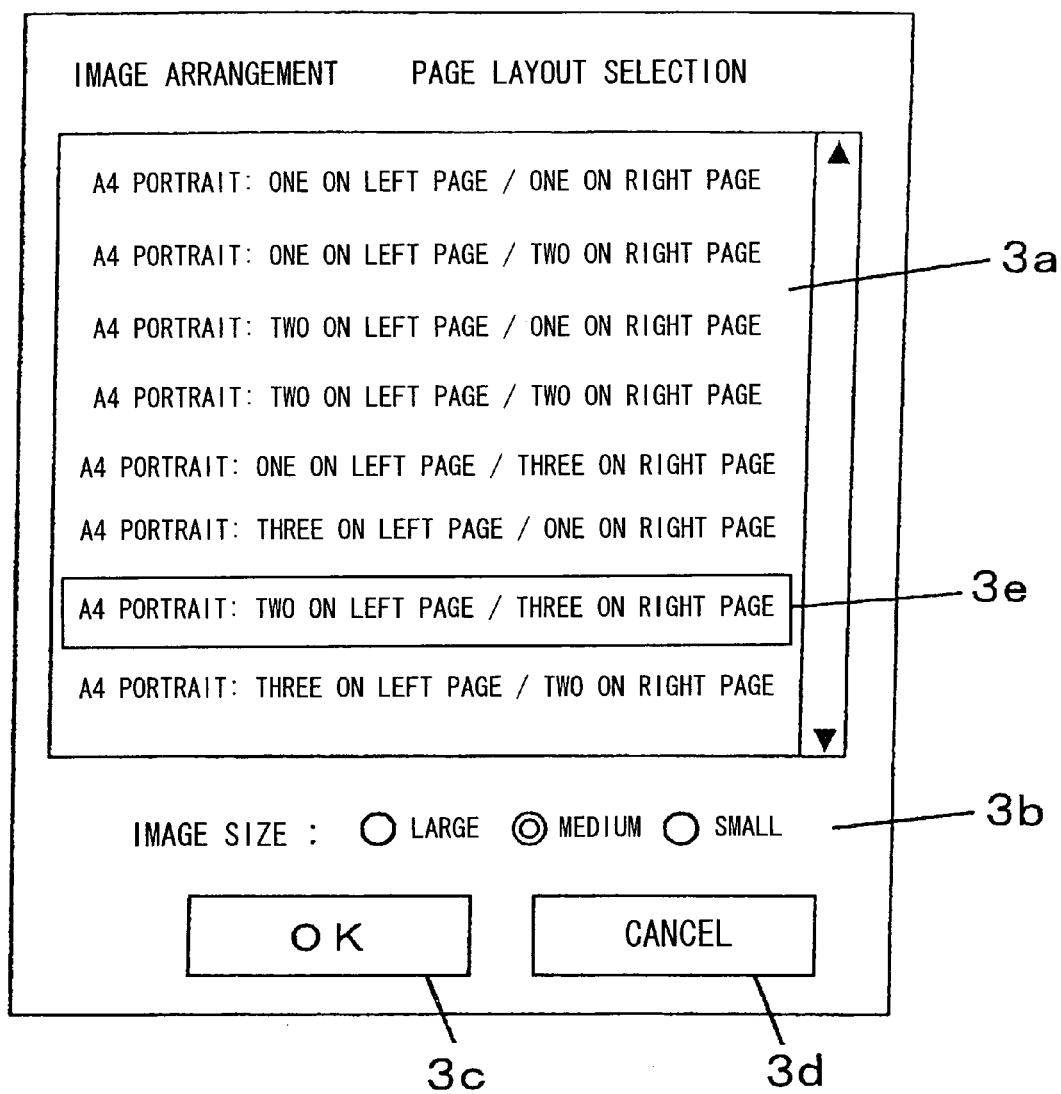
FIG. 3 is a figure showing a concrete example of a screen for page layout selection, in a first embodiment.

The screen for page layout selection shown in FIG. 3 includes a page layout selection region 3a, an image size selection button 3b, an "OK" button 3c, and a "cancel" button 3d. The display control section 103a displays information related to page layouts that the user can select for the album within the page layout selection region 3a as a list. As this information related to page layout, it is possible to select the size of the background paper upon which the images are to be arranged (A4, B5, or the like), the direction of the background paper (vertical or horizontal), and the number of images to be arranged upon each page (the number of images to be arranged). It should be understood that the album that is created in this embodiment is considered as being a double page spread, as will be described hereinafter, and it is possible to set the number of images to be arranged upon the page on its left side (i.e. upon the left page) and the number of images to be arranged upon the page on its right side (i.e. upon the right page) to be different.

For example, by selecting "A4 portrait: two on left page/three on right page" 3e from within the list displayed within the page layout selection region 3a, it is possible to set the page layout so that the background paper is A4 size arranged in the vertical direction, and so that two images are arranged upon the left page and three images are arranged upon the right page. Moreover, by operating the image size selection button 3b, the user may select the size of the images to be arranged upon each page (either large, medium, or small).

Figure 2:
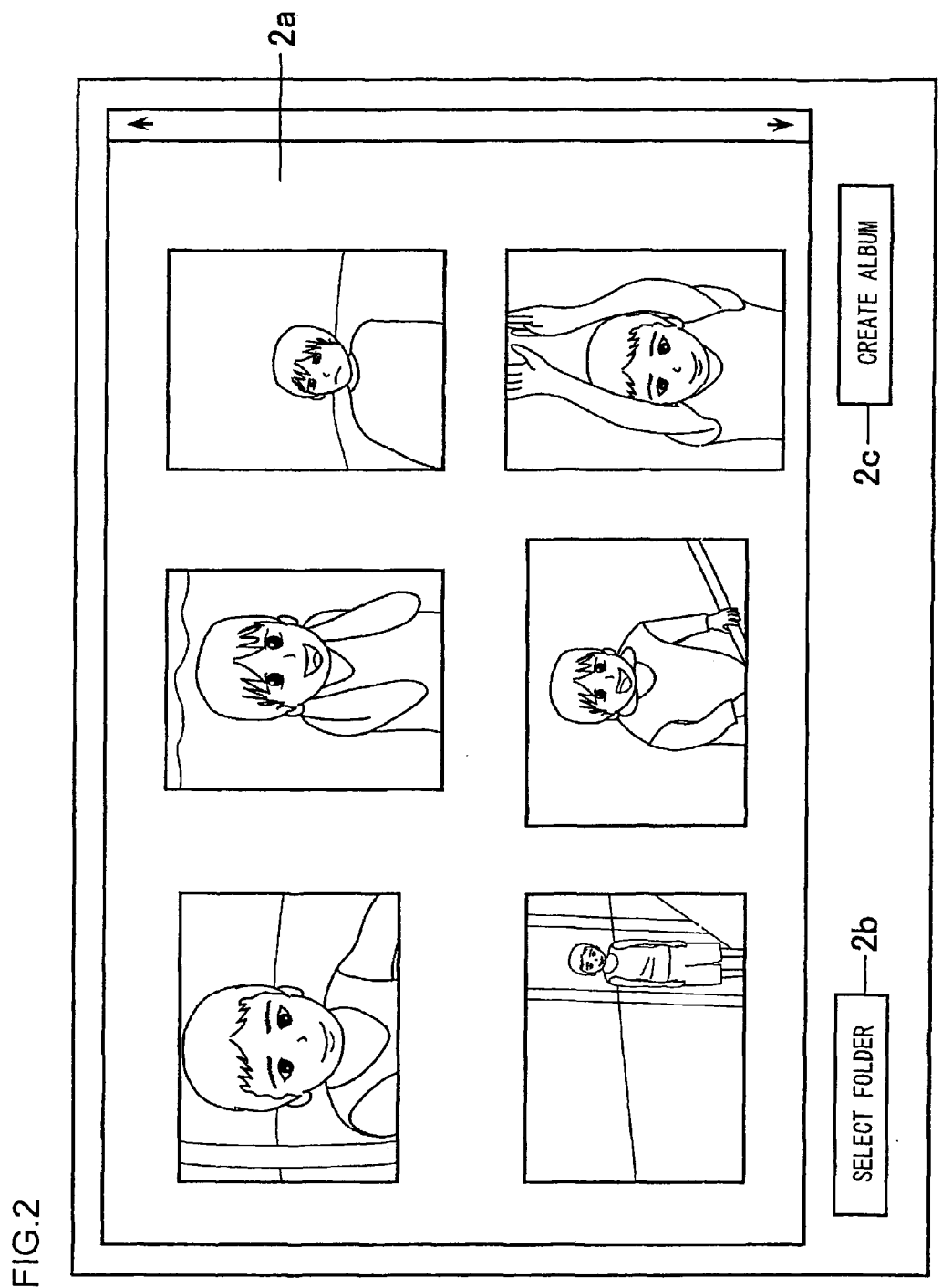
FIG. 2 is a figure showing a concrete example of a screen for image selection.

And, when the "OK" button 3c is pressed by the user, the album creation section 104b creates an album in which the images that were selected by the user upon the screen for image selection described in FIG. 2 above are arranged according to the page layout that was selected upon the screen for page layout selection shown in FIG. 3. It should be understood that, if the "cancel" button 3d is selected by the user upon the screen for page layout selection, then the display control section 103a displays the screen for image selection upon the monitor 105. In other words, the processing returns to the screen for image selection.

With the image display device 100 of this embodiment, templates (layout templates) that are used for creating albums according to page layouts selected by the user are prepared in advance and recorded upon the HDD 104. And the album creation section 104b reads in from the HDD 104 the template corresponding to the page layout that has been selected by the user upon the screen for page layout selection, and creates an album using this template that has been read in.

It should be understood that, when creating an album using a template, as described above, the images that are the subject of arrangement upon the pages may be either landscape images or portrait images. Due to this, in this embodiment, a plurality of templates for image arrangement are prepared in advance, including at least one of a portrait format image arrangement region for arranging images vertically, and a landscape format image arrangement region for arranging images horizontally. And it is arranged for the album creation section 103b to acquire the above described image orientation data from the appended information sections of the image files, to determine therefrom the orientations of the images that are to be the subjects of arrangement, and to create an album by selecting a template according to those orientations. This will now be explained in concrete terms.

Figure 4:
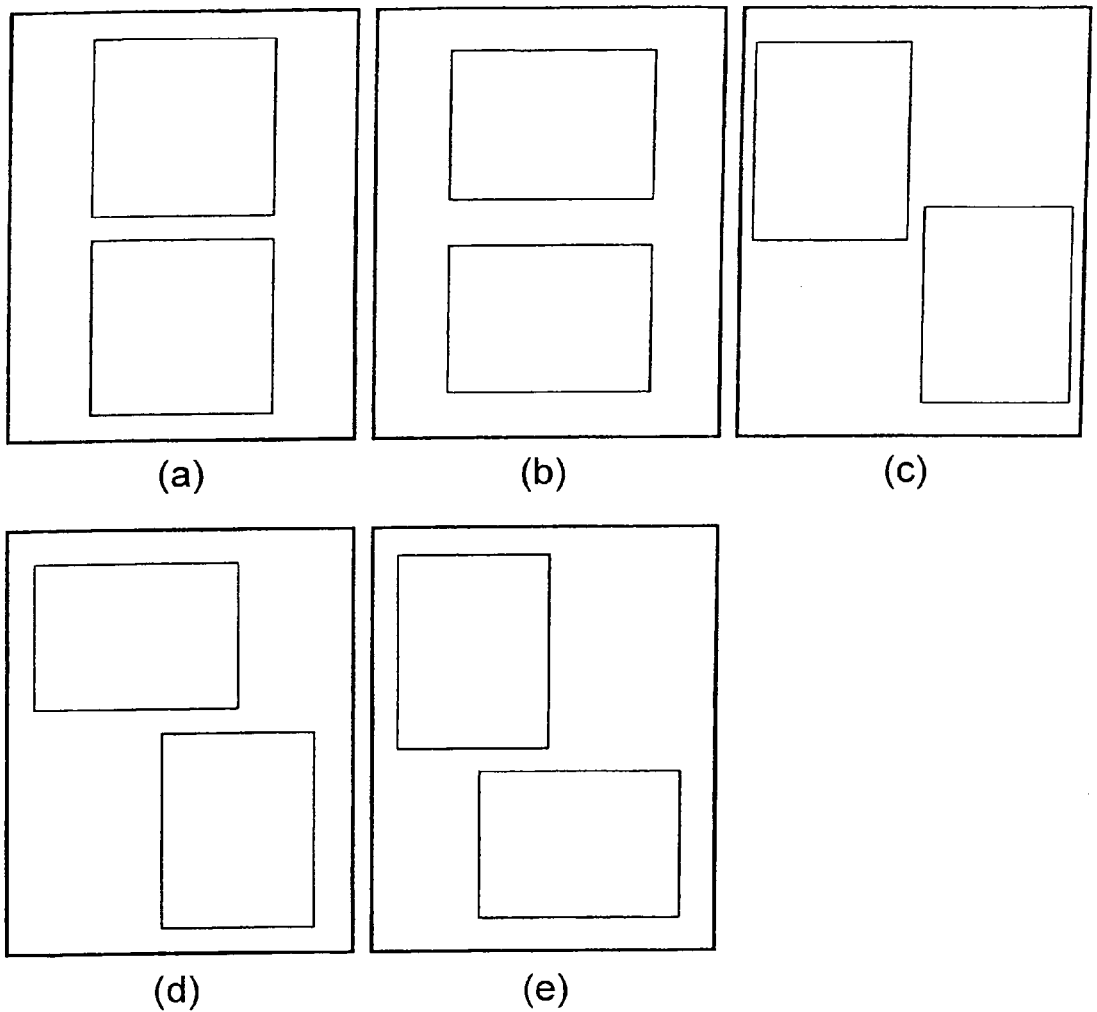
FIG. 4 is a first figure showing a prior art album creation method using templates.
Figure 5:
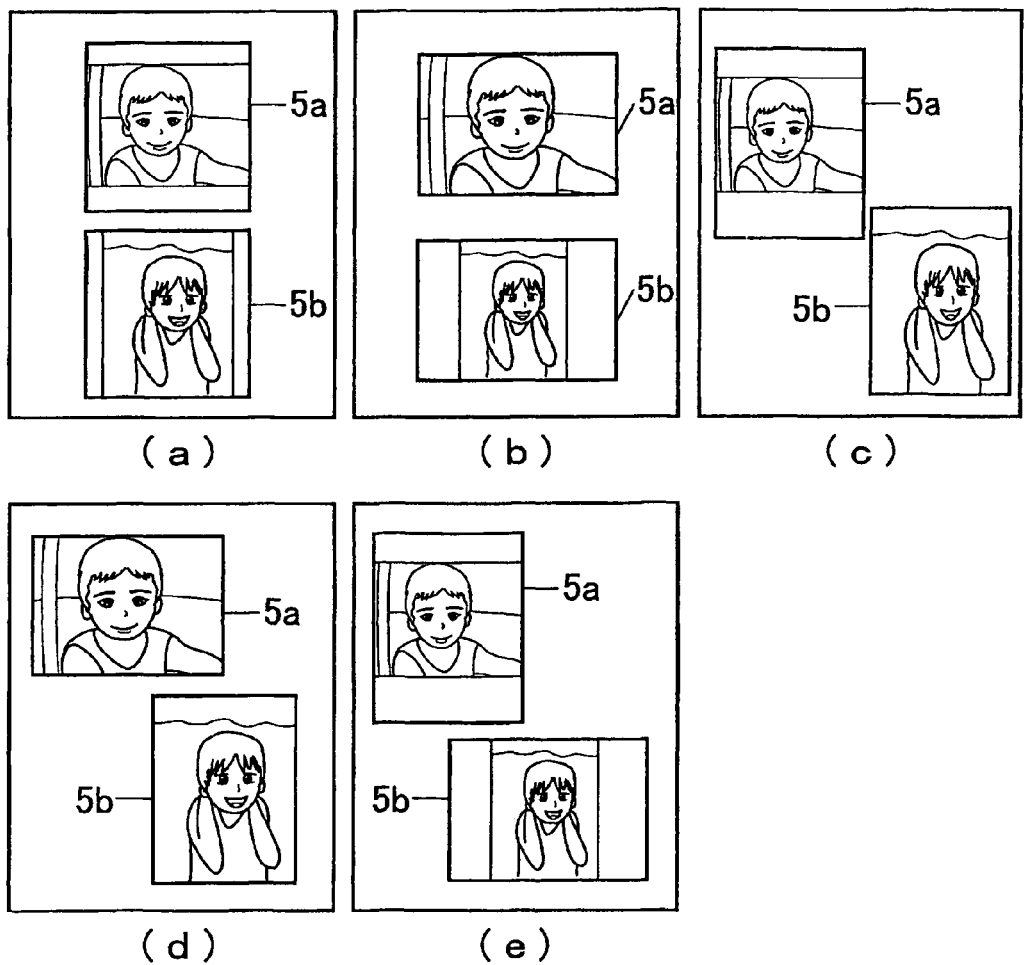
FIG. 5 is a second figure showing a prior art album creation method using templates.
Figure 6:
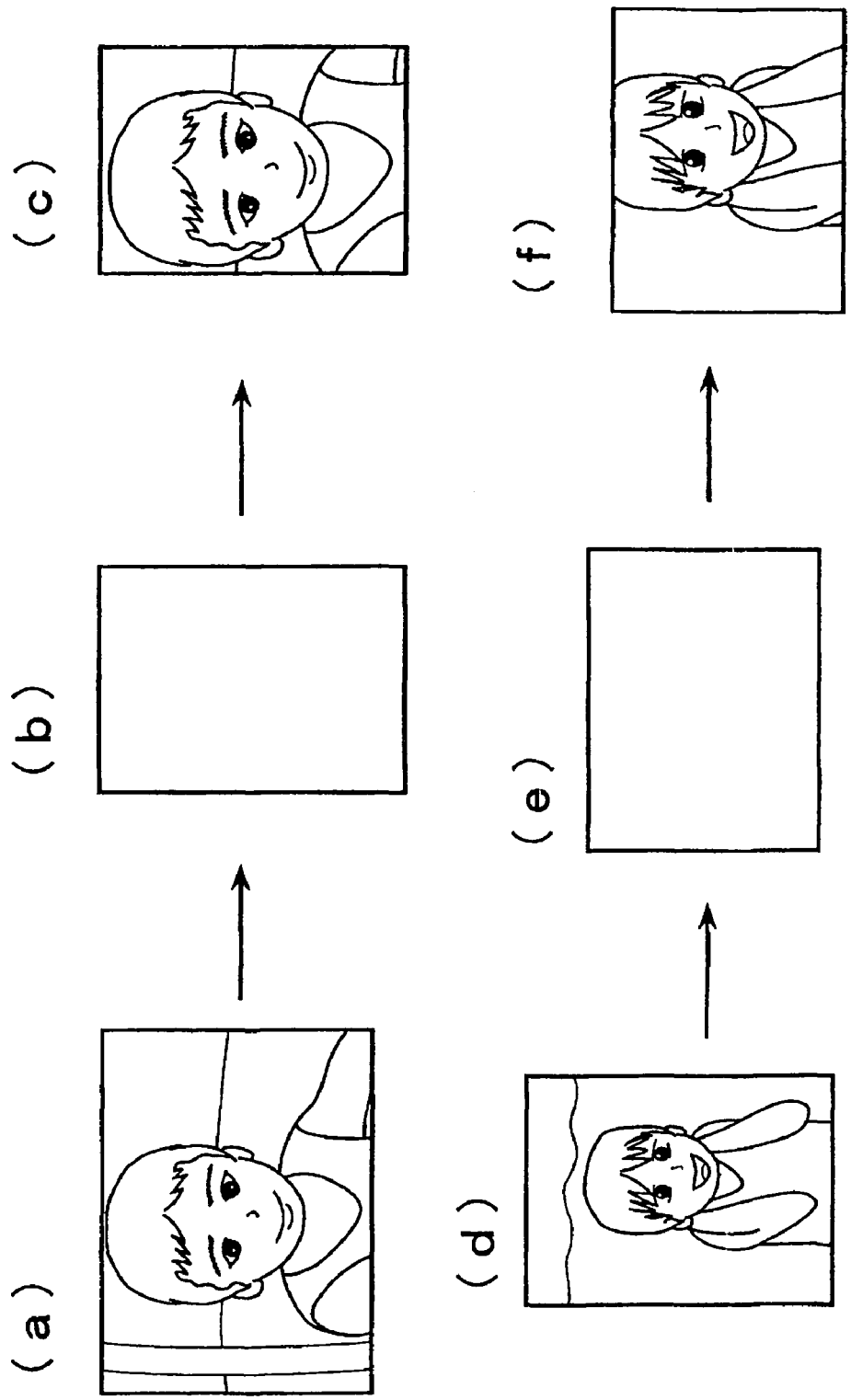
FIG. 6 is a third figure showing a prior art album creation method using templates.

First, a general prior art album creation method that employs templates will be explained with reference to FIGS. 4 through 6. The prior art differs from the present invention, in that templates for arranging landscape images and templates for arranging portrait images are not provided. For example, an album may be created using templates as shown in FIG. 4. It should be understood that each of the templates shown in FIG. 4 is a template for arranging two images upon one page. In the following, examples will be explained of arranging two images using the templates shown in FIG. 4, with the first image being a landscape image and the second image being a portrait image.

The template shown in FIG. 4(a) is a template for arranging two images each within its own square frame, irrespective of the orientation of the images. An example is shown in FIG. 5(a) of arranging a landscape image and a portrait image each within its own frame by using this template. In this case, unused space appears within each of the frames, and this is undesirable. In other words, when the landscape image 5a is to be disposed within a square frame, it is necessary to put the image into the frame after having adjusted its image size so that the horizontal width of the image matches the horizontal width of the frame, and as a result unused space undesirably appears above and below the landscape image 5a. Moreover, when the portrait image 5b is to be arranged in its frame, in a similar manner, it is necessary to put the image into its frame after having adjusted its image size so that the vertical height of the image matches the vertical height of the frame, and as a result unused space undesirably appears to the left and to the right of the portrait image 5b.

The template shown in FIG. 4(b) is a template for arranging two images each within a landscape format frame whose aspect ratio matches the aspect ratio of a landscape image, irrespective of the orientation of the images. An example is shown in FIG. 5(b) of arranging a landscape image and a portrait image each within its own frame by using this template. In this case, the landscape image 5a fits neatly into its frame, since its aspect ratio and the aspect ratio of the frame match one another. However, with regard to the portrait image 5b, it is necessary to put the image into its frame after having adjusted its image size so that the vertical height of the image matches the vertical height of the frame, and as a result unused space undesirably appears to the left and to the right of the image.

The template shown in FIG. 4(c) is a template for arranging two images each within a portrait format frame whose aspect ratio matches the aspect ratio of a portrait image, irrespective of the orientation of the images. An example is shown in FIG. 5(c) of arranging a landscape image and a portrait image each within its own frame by using this template. In this case, the portrait image 5b fits neatly into its frame, since its aspect ratio and the aspect ratio of the frame match one another, but, with regard to the landscape image 5a, it is necessary to put the image into its frame after having adjusted its image size so that the horizontal width of the image matches the horizontal width of the frame, and as a result unused space undesirably appears above and below the image.

The template shown in FIG. 4(d) is a template for arranging a first image in a landscape format frame whose aspect ratio matches the aspect ratio of a landscape image, and a second image in a portrait format frame whose aspect ratio matches the aspect ratio of a portrait image, irrespective of the orientation of the images. An example is shown in FIG. 5(d) of arranging a landscape image and a portrait image each within its own frame by using this template. In this case, both the landscape image 5a and the portrait image 5b fit neatly into their frames, since their aspect ratios and the aspect ratios of the frames match one another.

The template shown in FIG. 4(e) is a template for arranging a first image in a portrait format frame whose aspect ratio matches the aspect ratio of a portrait image, and a second image in a landscape format frame whose aspect ratio matches the aspect ratio of a landscape image, irrespective of the orientation of the images. An example is shown in FIG. 5(e) of arranging a landscape image and a portrait image each within its own frame by using this template. In this case, with regard to the landscape image 5a, it is necessary to put the image into its frame after having adjusted its image size so that the horizontal width of the image matches the horizontal width of the frame, and as a result unused space undesirably appears above and below the image. Moreover, with regard to the portrait image 5b, it is necessary to put the image into its frame after having adjusted its image size so that the vertical height of the image matches the vertical height of the frame, and as a result unused space undesirably appears to the left and to the right of the image.

If templates such as those shown in FIG. 4 are prepared and provided in advance in this manner, then, in the example described above, only the template shown in FIG. 4(d) is capable of creating an album in an optimum way upon the page by arranging the images as shown in FIG. 5(d). And, if some other template is used, then, due to the images being inscribed within the frames, in other words due to the size of the images being adjusted, in order to display the entire images within the frames, so as to match the lengths along the longer sides of the images (in the case of a portrait image, its length along the vertical direction) to the dimensions of the frames in those directions, the problems arise that unused space appears within one or more of the frames, and that one or more of the images is undesirably shrunk down more than necessary.

Furthermore, in order to prevent the occurrence of unused space within the frames and in order to prevent the images from being shrunk down, a method is also known of circumscribing the images around the frames. In other words, the images are magnified by adjusting the sizes of the images so that the lengths along the shorter sides of the images (in the case of a portrait image, its length along the horizontal direction) are matched to the dimensions of the frames in those directions. Due to this, protruding portions of the images are cut away, since the longer sides of the images project out from the frames. Concrete examples in which the images are circumscribed around the frames are shown in FIG. 6.

For example, when the landscape image shown in FIG. 6(a) is to be arranged within a portrait format frame whose aspect ratio matches that of a portrait image as shown in FIG. 6(b), then the image is magnified so as to make the length of the side of the image along the vertical direction match the length of the side of the frame along the vertical direction, and accordingly the side of the image along the horizontal direction is cut so as to match the length of the frame along the horizontal direction. By doing this, as shown in FIG. 6(c), it is possible to display the image magnified within the entire frame. Moreover, when the portrait image shown in FIG. 6(d) is to be arranged within a landscape format frame whose aspect ratio matches that of a landscape image as shown in FIG. 6(e) as well, then it is possible to display the image magnified within the entire frame in a similar manner, as shown in FIG. 6(f). However, when an image is circumscribed around a frame in this manner, the problem arises that portions of the image that protrude outside from the frame are cut away, which is not desirable, and it is not possible to display the entire image.

A method for resolution of these problems may be contemplated in which the user selects a template for creating each page, from among the templates shown in 4(a) through 4(e) for example, according to the orientations of the images that are to be arranged upon that page. However, if the orientations of the images that are to be arranged upon each of the pages are different, then it is necessary to select a layout for each of the pages individually, and the operation becomes troublesome. Moreover, while in FIGS. 4 and 5 examples were shown in which two images were arranged upon a single page, if the case is considered when three or more images are to be arranged upon a single page, then the operation becomes even more troublesome, since the number of templates becomes large and it is necessary for the user to perform selection from among this large number of templates. Furthermore, if as described above the numbers of images that are to be arranged upon the left page and upon the right page are different, then the selection becomes difficult, and it is not practical to force the user to perform this task.

It should be understood that it is possible to solve problems like those described above, if it is arranged for the sizes of the frames provided in the templates to be made variable, or if it is made possible for the user to change them freely, or for it to be possible for the user to arrange the images upon the background paper without providing any frames at all. However, in such cases, the merit of creating an album using fixed templates such as those described above, in other words the convenience that the user is able to create an album in a simple manner, only by selecting images without needing to arrange them, is lost, and this is undesirable.

Accordingly, in this embodiment, in order to eliminate this problematical aspect of the prior art, a template set (a layout template set) that consists of a plurality of templates is prepared in advance, so that it is possible to select the optimum template according to the orientations of the images that are to be the subjects for arrangement. FIG. 7 is a figure showing a concrete example of a template set made up from a plurality of templates that are used for arranging two images upon one page. This template set consists of the four templates shown in FIGS. 2(a) through 2(d). In the following, each of these templates will be explained.

The template shown in FIG. 7(a) is a template that is to be used when both the first image and the second image to be arranged upon the page are landscape images. In other words, it is a template for arranging each of the first image and the second image in a landscape format frame (i.e. within an image positioning region) whose aspect ratio matches that of a landscape image.

The template shown in FIG. 7(b) is a template that is to be used when the first image to be arranged upon the page is a landscape image, and the second image is a portrait image. In other words, it is a template for arranging the first image in a landscape format frame (i.e. within an image positioning region) whose aspect ratio matches that of a landscape image, and for arranging the second image in a portrait format frame whose aspect ratio matches that of a portrait image.

The template shown in FIG. 7(c) is a template that is to be used when the first image to be arranged upon the page is a portrait image, and the second image is a landscape image. In other words, it is a template for arranging the first image in a portrait format frame (i.e. within an image positioning region) whose aspect ratio matches that of a portrait image, and for arranging the second image in a landscape format frame whose aspect ratio matches that of a landscape image.

And the template shown in FIG. 7(d) is a template that is to be used when both the first image and the second image to be arranged upon the page are portrait images. In other words, it is a template for arranging each of the first image and the second image in a portrait format frame (i.e. within an image positioning region) whose aspect ratio matches that of a portrait image.

It should be understood that, in this embodiment, it will be supposed that each of the templates is labeled with (number of images arranged upon the page)-(symbol showing the orientation of the first image) (symbol showing the orientation of the second image) . . . (symbol showing the orientation of the n-th image). Here, it is supposed that the symbols that show the orientations of the images are "H" in the case of a landscape image and "V" in the case of a portrait image. For example, in the example shown in FIG. 7, the template shown in FIG. 7(a) is labeled "2-HH", and the template shown in FIG. 7(b) is labeled "2-HV". Moreover, the template shown in FIG. 7(c) is labeled "2-VH", and the template shown in FIG. 7(d) is labeled "2-VV". It should be understood that, in the following explanation, it will be supposed that the various templates will be designated using these labels. For example, the template that is marked "2-HH" will be referred to as the template 2-HH.

Moreover, it should be understood that upon the screen for page layout selection shown in FIG. 3, as described above, it is arranged for the user to be able to operate the image size selection button 3b, so as to set any one of "large", "medium", and "small" as the size of the images to be arranged upon the page. Due to this, it is necessary to prepare a plurality of sets of templates corresponding to the size of the images to be arranged upon the page (in other words, that take into account the sizes of the image arrangement regions).

Figure 8:
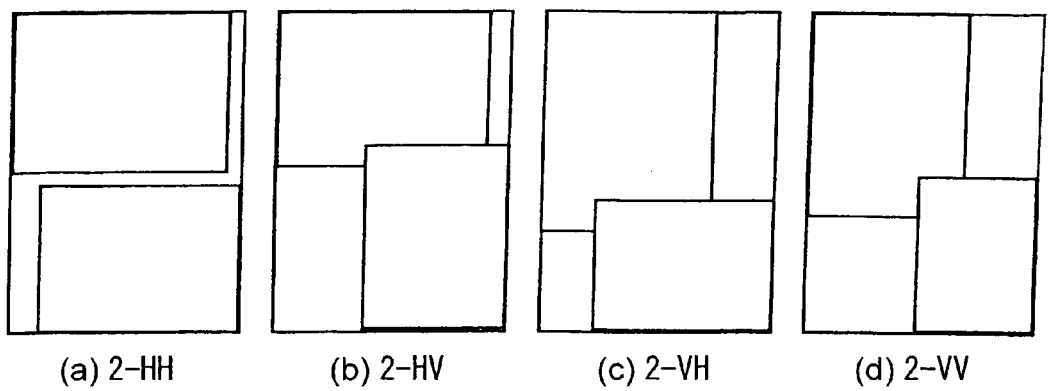
FIG. 8 is a figure showing a concrete example of a template set that is used for arranging two images (of large image size) upon one page.
Figure 9:
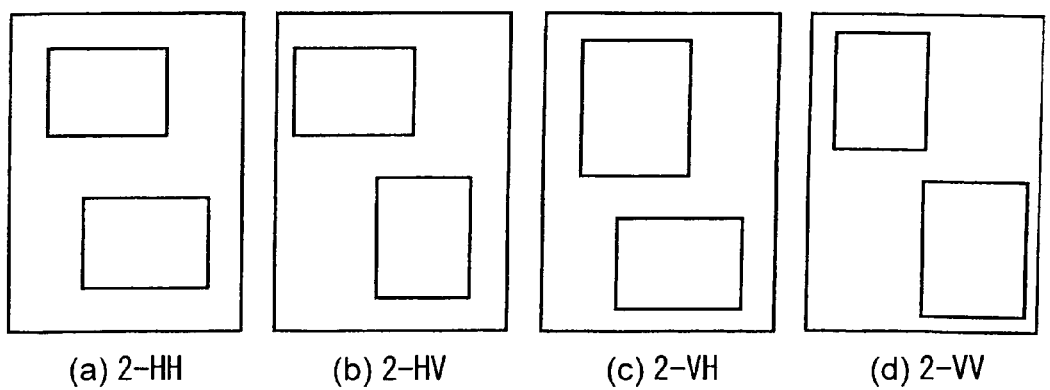
FIG. 9 is a figure showing a concrete example of a template set that is used for arranging two images (of small image size) upon one page.

For example, the template set shown in FIG. 7 is considered as being a template set that is to be used when the size of the images has been set by the user to "medium" upon the screen for page layout selection shown in FIG. 3. And the template set shown in FIG. 8 is prepared and stored as a template set that is to be used when the size of the images is set to "large", while the template set shown in FIG. 9 is prepared and stored as a template set that is to be used when the size of the images is set to "small". In the following explanation, it will be considered that the size of the images has been set by the user to be "medium", so that the case will be explained of creating an album using the template set shown in FIG. 7.

Furthermore while, in the following explanation, the use of the template set of FIG. 7 for arranging two images upon one page is explained as a representative, a template set for arranging one image upon one page, and template sets for arranging three or more images upon one page, are also prepared in advance and recorded upon the HDD 104.

FIG. 10 shows a concrete example of a template set that is used for arranging a single image upon one page. In this template set, there are included two templates: a template 1-H shown in FIG. 10(a) and a template 1-V shown in FIG. 10(b).

Figure 11:
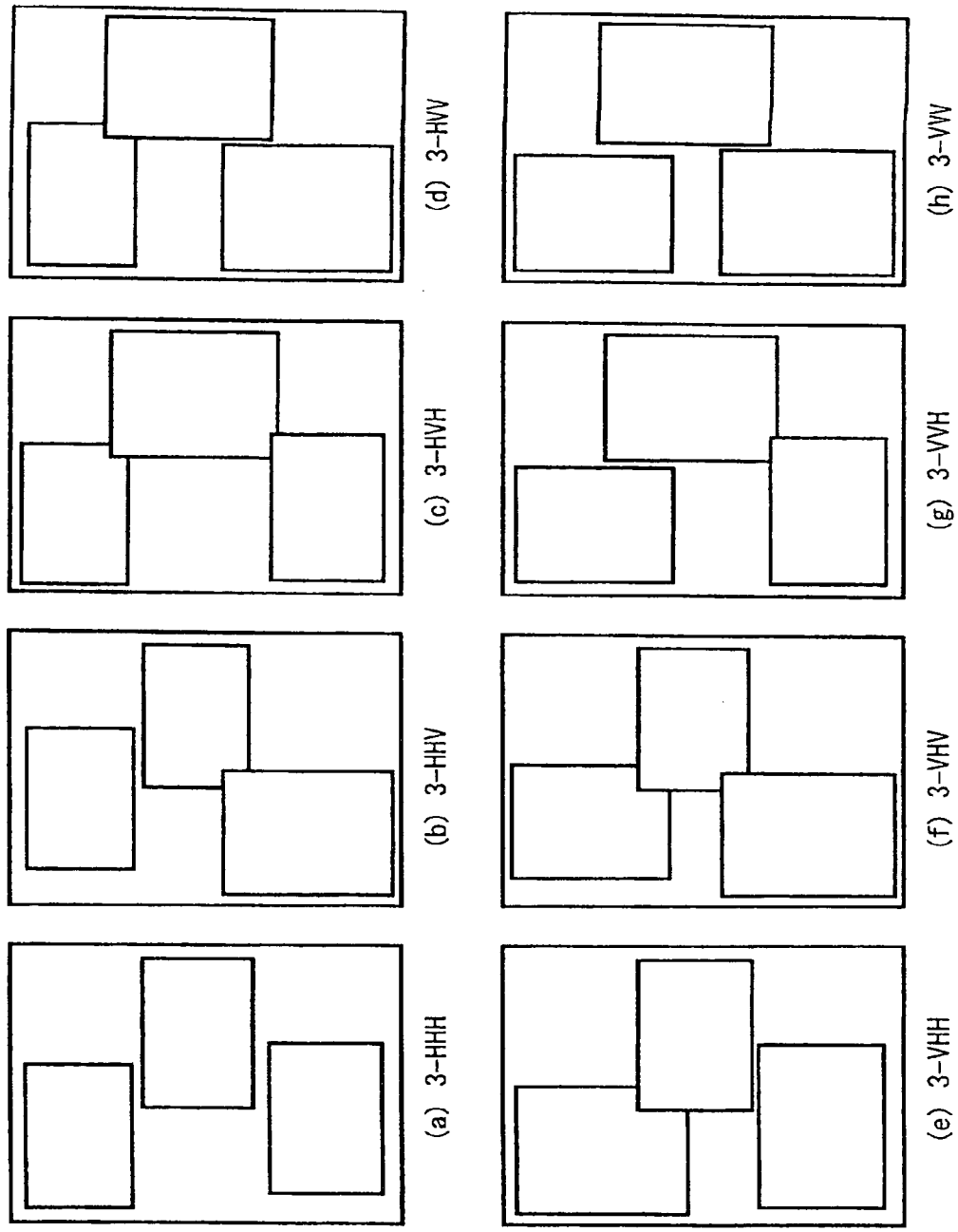
FIG. 11 is a figure showing a concrete example of a template set that is used for arranging three images upon one page.

Furthermore, FIG. 11 is a figure showing a concrete example of a template set that is used for arranging three images upon one page. In this template set, there are included eight templates: a template 3-HHH shown in FIG. 11(a), a template 3-HHV shown in FIG. 11(b), a template 3-HVH shown in FIG. 11(c), a template 3-HVV shown in FIG. 11(d), a template 3-VHH shown in FIG. 11(e), a template 3-VHV shown in FIG. 11(f), a template 3-VVH shown in FIG. 11(g), and a template 3-VVV shown in FIG. 11(h).

When the "OK" button 3c is pressed by the user upon the screen for page layout selection shown in FIG. 3, the album creation section 103b reads in from the HDD 104 the optimum template set (the "subject template set") corresponding to the page layout that has been set. For example, if as described above "A4 portrait: two on left page/three on right page" 3e has been selected from the list displayed in the page layout selection region 3a, and the size of the images has been set to "medium", then a template set is read in as described below.

That is, since on the left page it is necessary to arrange two images upon the page, while on the right page it is necessary to arrange three images upon the page, accordingly the album creation section 103c reads in from the HDD 104 the template set for arranging two images upon one page shown in FIG. 7 (the template set for two images) and the template set for arranging three images upon one page shown in FIG. 11 (the template set for three images).

And the album creation section 103b applies the template set for two images to the left page of the album while applying the template set for three images to its right page, and creates an album in which the images are arranged by following these templates. At this time, the template that is used for creating each page is selected from each of the template sets, according to the orientations of the images that are to be the subjects for arrangement.

In other words, for all of the images that have been selected by the user upon the screen for image selection shown in FIG. 2, the album creation section 103b determines upon which page they are to be arranged, on the basis of the number of images that can be arranged upon each page. And, for each page, the album creation section 103b acquires the image orientation data recorded in the appended information sections of the image files, and decides upon the orientations of the images that are to be the subjects for arrangement. Moreover, for each page, the album creation section 103b selects the template to be used according to the orientations of the images that are to be the subjects for arrangement.

For example, if the two images that are to be arranged upon some left page are both landscape images, then the album creation section 103b selects the template 2-HH of FIG. 7(a) from among the template set for two images shown in FIG. 7. Furthermore if, among the three images to be arranged upon some right page, the first image and the second image are portrait images while the third image is a landscape image, then the album creation section 103b selects the template 3-VVH of FIG. 11(g) from among the template set for two images shown in FIG. 11.

Figure 12:
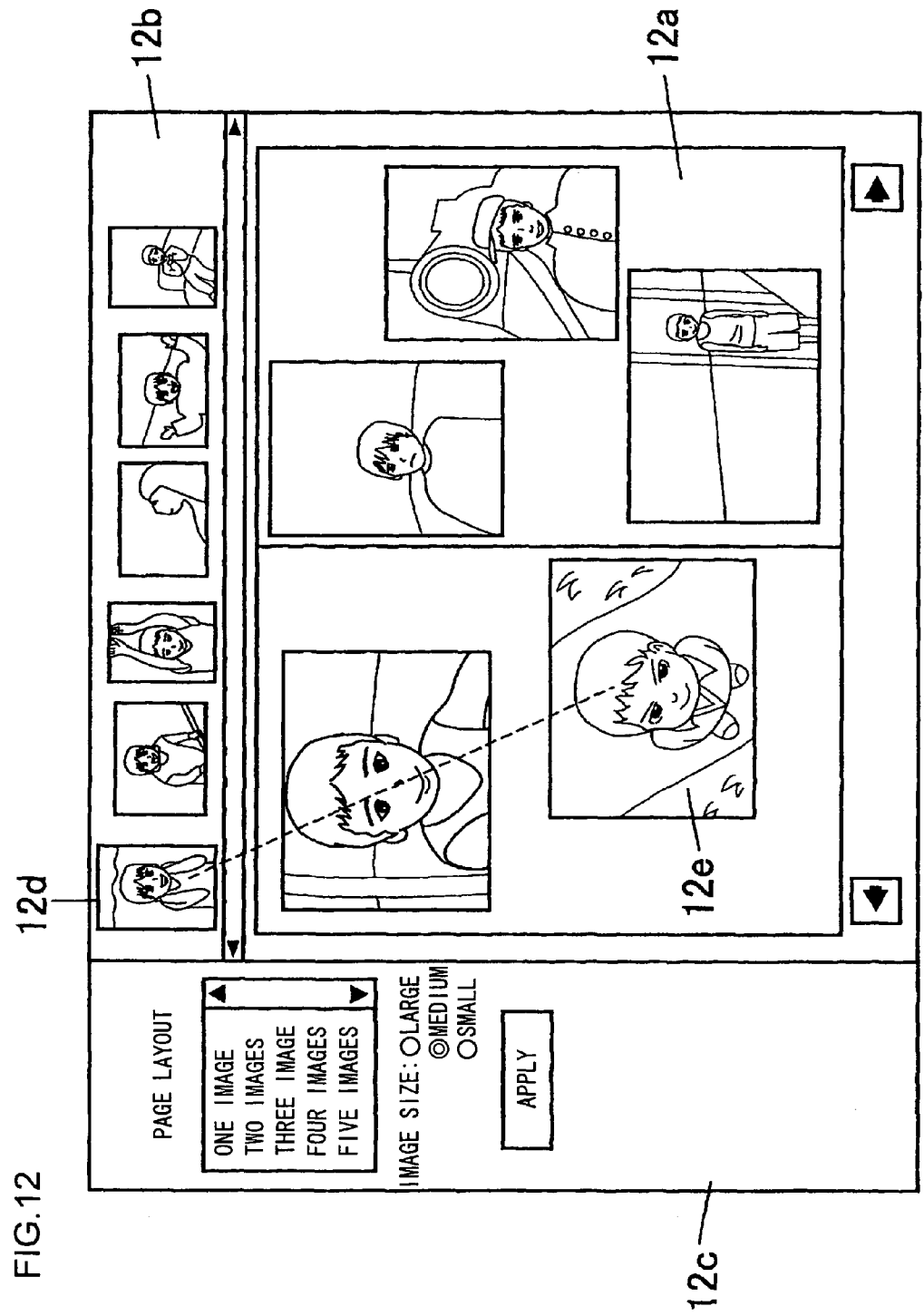
FIG. 12 is a figure showing a concrete example of a screen for album editing, in the first embodiment.

The display control section 103a outputs to the monitor 105 a screen for album editing, upon which is displayed the two page spread layout for the album created in this manner by the album creation section 103b. FIG. 12 is a figure showing a concrete example of the screen for album editing when the template 2-HH has been applied to the left page of the two page spread, while the template 3-VVH has been applied to the right page. The screen area of this screen for album editing is divided into three regions: a layout display region 12a, a thumbnail image display region 12b, and a layout selection region 12c.

In the layout display region 12a, the layout is displayed for the two page spread created by the album creation section 103b; while, in the thumbnail image display region 12b, images are displayed for the thumbnail images that were not selected by the user, even though they were displayed in the image display region 2a as explained with FIG. 2. In other words, among the images recorded in the folder that was selected upon the screen for image selection, thumbnail images are displayed for those images that were not used for album creation. Furthermore, in the layout selection region 12c, there are arranged objects that, as will be described hereinafter, are used for changing the page layout of an album that the user has already created.

On this screen for album editing, the user is able to edit an album that has been created automatically by the album creation section 103. In concrete terms, by operating a mouse that is included in the operation members 101 and selecting any one of the thumbnail images that are being displayed within the thumbnail image display region 12b, and by shifting it over any one of the images within the image display region 2a by drag and drop operation, the user is able to exchange the image that is the destination of shifting for the selected thumbnail image. At this time, if the orientation of the image that was positioned before the replacement and the orientation of the image that is positioned after the replacement are the same, then the album creation section 103b does not change the template that is applied to this page.

By contrast, if the orientation of the image that was positioned before the replacement and the orientation of the image that is positioned after the replacement are different, then the album creation section 103b selects, from among the template set that has already been read in, the template that corresponds to the orientation of the image that is to be positioned after the replacement, and performs correction by applying this selected template to this page. By way of example, the case will now be described in which, in the example shown in FIG. 12, the user performs drag and drop operation upon the portrait image 12d that is being displayed in the thumbnail image display region 12b, and performs replacement of it for the landscape image 12e that is already disposed on the left page within the image display region 2a.

Since, in this case, the orientation of the image that was positioned before the replacement (landscape) and the orientation of the image that is positioned after the replacement (portrait) are different, accordingly, if the template 2-HH that has already been applied to the left page is used just as it is, so that the images are arranged just as they are without any modification being made, then a similar problem will occur as in the prior art described above, because the orientation of the second image is different from the orientation of its frame. Due to this, the album creation section 103b selects the template 2-HV shown in FIG. 7(b) from among the template set for two images, on the basis of the orientation of the first image that is not the subject of replacement (landscape) and the orientation of the second image after replacement (portrait), and applies this template to the left page.

Figure 13:
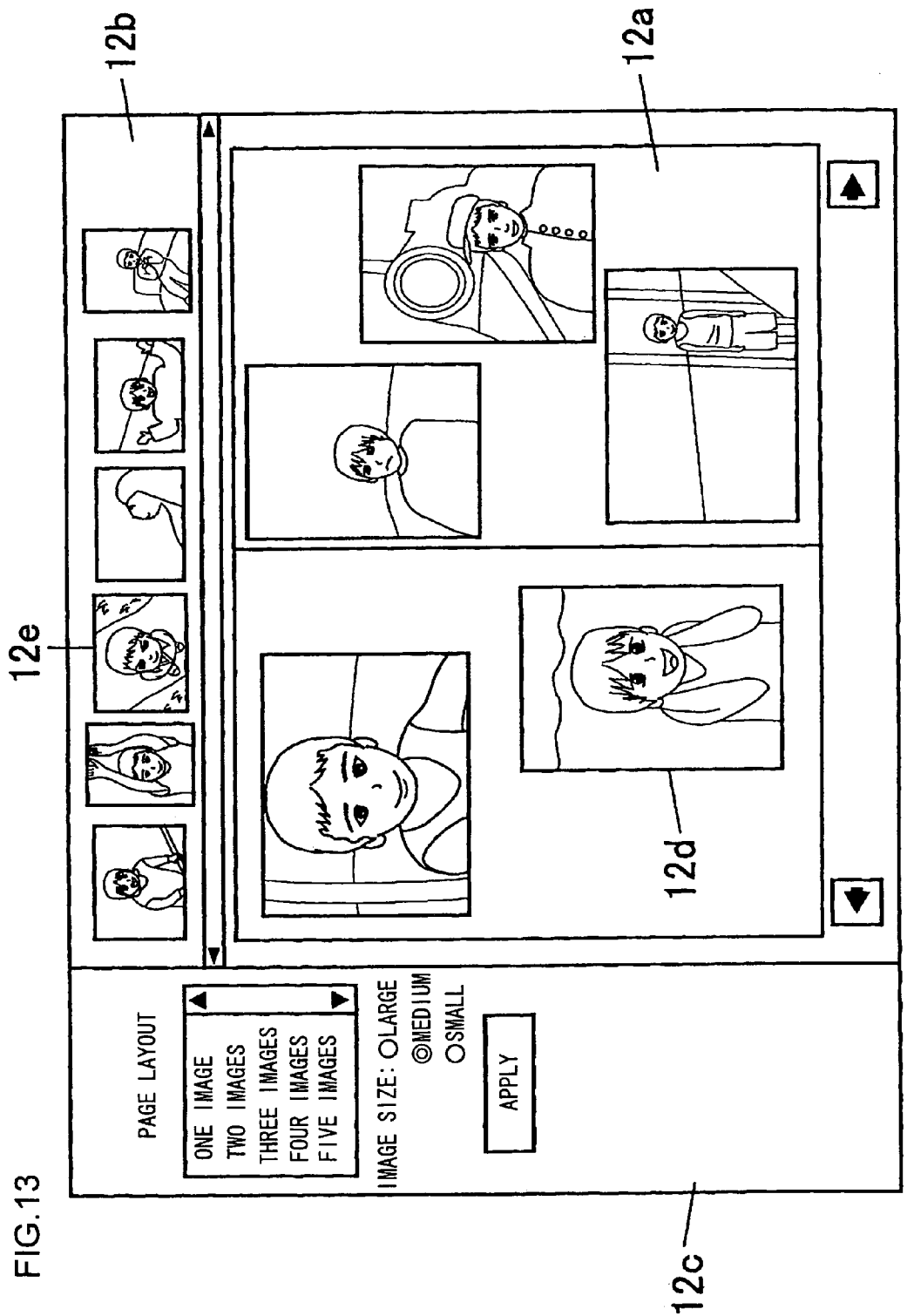
FIG. 13 is a first figure showing a concrete example of album editing, in the first embodiment.

Due to this, it is possible to replace the image displayed within the thumbnail image display region 12b for the image arranged upon the page in the image display region 2a, while changing the selection of the optimum template according to the orientation of the image disposed after the replacement. In other words, as shown in FIG. 13, the template that is applied to the left page is changed to the template 2-HV. And the image 12d that has been shifted from within the thumbnail image display region 12b is now arranged within the left page as its second image, while the image 12e that was originally arranged upon that page is now displayed as a thumbnail within the thumbnail image display region 12b as an image that is not currently being used for album creation.

Furthermore, by operating the objects that are arranged in the layout selection region 12c of the screen for album editing, the user is able to change the layout of the pages. If the layout is thus changed by the user, then the album creation section 103b changes the template that is applied to each page to one that matches the layout after change.

Figure 14:
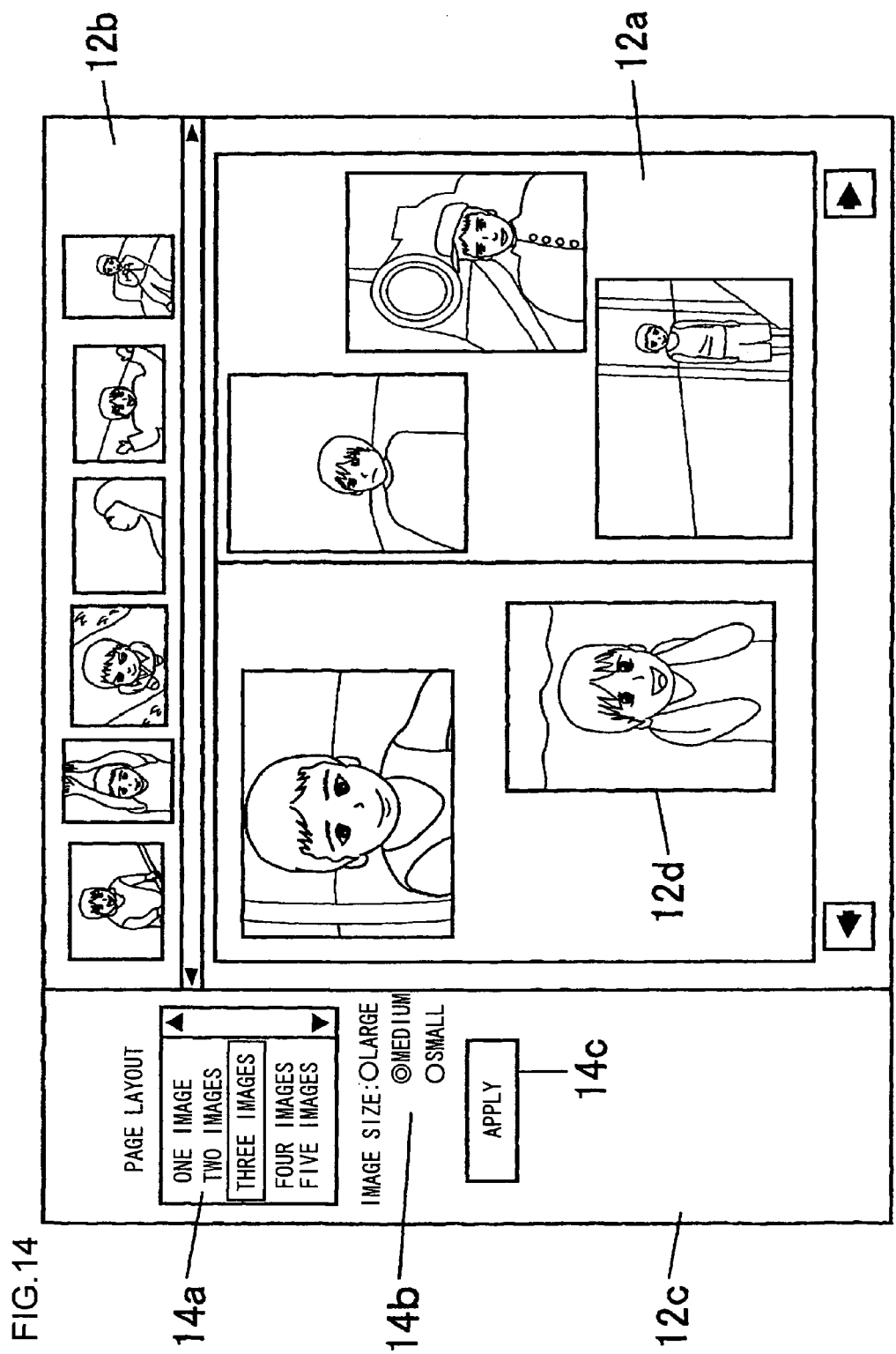
FIG. 14 is a second figure showing a concrete example of album editing, in the first embodiment.

A concrete example will now be explained using FIG. 14. An object 14a for changing the number of images, an object 14b for changing the image size, and an "apply" button 14c are provided within the layout selection region 12c. The user is able to change the image size of the objects arranged upon the page by operating the object for changing the image size 14b with the mouse included in the operation members 101. For example, if the current image size is "medium", then the user is able to change it to "large" or to "small". When the image size is changed by the user and the "apply" button 14c is clicked, then the album creation section 103b reads in from the HDD 104 a template set that corresponds to the image size after this change, and applies it to the pages.

In concrete terms, when the size of the images to be arranged upon each page is set to "medium" and an album is created using the template set shown in FIG. 7, then, if the image size is changed by the user to "large", the album creation section 103b reads in the template set shown in FIG. 8 for the case in which the size of the images is "large", and re-applies it to the pages. Moreover, if the image size is changed by the user to "small", then the album creation section 103b reads in the template set shown in FIG. 9 for the case in which the size of the images is "small", and re-applies it to the pages.

Furthermore, the user is able to change the number of images arranged upon each page by operating the object for changing the number of images 14a with the mouse included in the operation members 101. For example, if the number of images currently arranged upon the left page is two, the user is able to change this number of images to one or to three or more by operating the object for changing the number of images 14a after having selected the left page by clicking with the mouse within the left page in the image display region 2a; and then, by clicking the "apply" button 14c, he is able to command the number of images arranged upon the left page to be actually changed.

In concrete terms, when the number of images to be arranged upon the left page is set to two, and an album is created using the template set shown in FIG. 7, then, if the number of images to be arranged upon the left page is changed by the user to one, the album creation section 103b reads in the template set for one image shown in FIG. 10, and re-applies it to the left page that is selected. Due to this, on all of the left pages that make up the album, the number of images to be arranged is changed from two to one. In this case, since it now becomes possible to position only one image on each left page although, up until now, two images were positioned there, accordingly the positions at which the images are arranged are moved onwards in order, so that the arrangement of the images upon the pages changes greatly.

In this case, as the result of moving the positions at which the images are arranged onwards in order, a requirement arises for the album creation section 103b to change the selection, from the template set, of the template that is to be applied to each page, according to the orientations of the images that now come to be arranged upon each page. For example, in the example shown in FIG. 14, the image 12d that is the second image is moved onwards to being the first image upon the right page, and, together with this, the first image upon the right page becomes the second image there, the second becomes the third, and the third image is moved onwards to the next page. Since due to this three portrait images have come to be arranged upon the right page after the images have been moved onwards in order, accordingly the album creation section 103b changes the template to be applied to the right page from the template 3-VVH that has been applied up until now, to the template 3-VVV.

Furthermore, if the number of images to be arranged upon the left page is changed by the user to three, then the album creation section 103b reads in the template set for three images shown in FIG. 11, and re-applies it to the left page that is selected. Together with this, it becomes possible to arrange one image more than previously upon the left page. In this case, in a similar manner to the case described above in which the number of images was reduced, the procedure is also contemplated of filling up the gaps by moving forwards the images upon the next and subsequent pages into the frames in which images can now be arranged upon the left pages. In this case, the album creation section 103b may select the optimum template for arranging the images upon each page according to the orientations of the images that are to be arranged upon the pages after this shifting forward has been performed.

As another procedure, it would also be acceptable to arrange to fill with blank white color the frame that has been added by increasing the number of images arranged upon the left page to three, and to arrange for the user to be able to select any desired image from the thumbnail image display region 12b and to arrange this image within the frame that has been added. For example, as the template for application to the left page, from the template set for three images, a template may be selected in which the layout comply with the orientations of the already arranged first and second images. Since, in FIG. 14, the first image upon the left page is a landscape image and the second image is a portrait image, accordingly the template 3-HVH or the template 3-HVV may be selected. Here, the explanation will suppose that the template 3-HVH has been selected.

Figure 15:
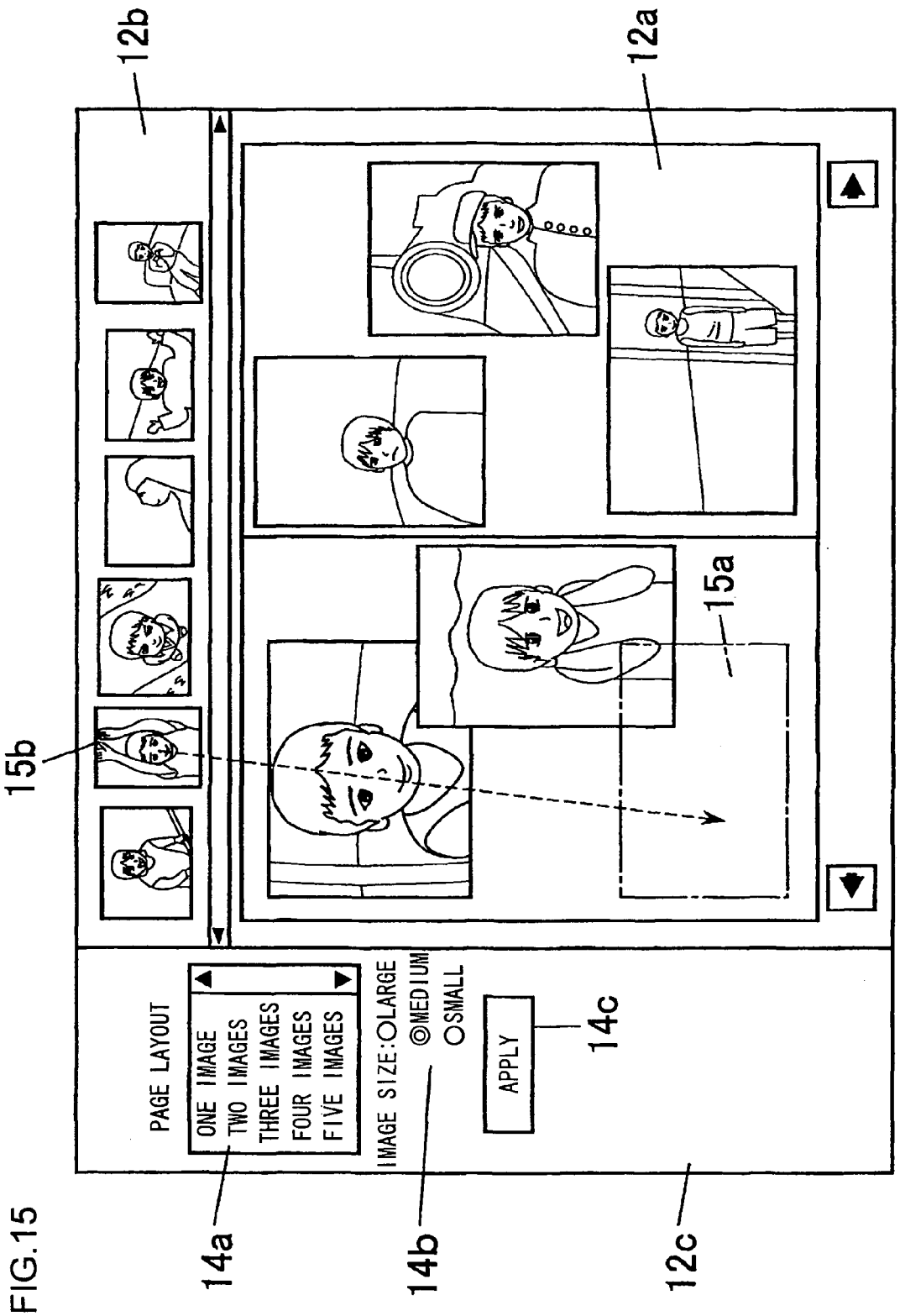
FIG. 15 is a third figure showing a concrete example of album editing, in the first embodiment.

The album creation section 103b applies the template that has been selected to the left page, and creates an album in which it is possible to arrange three images upon the left page, as shown in FIG. 15. At this time, the space within the frame 15a is left as blank white color, in order for a third newly added image to be arranged upon the left page. The user selects from the thumbnail image display region 12b the thumbnail image 15b that he desires, and is able to add the image 15b whose thumbnail is being displayed within this thumbnail image display region 12b to the left page by performing drag and drop operation to drop it into the frame 15a.

At this time, if the orientation of the frame 15a in the template that is currently being applied to the left page and the orientation of the image 15b that has just been added into the frame 15a by the user are different, then the album creation section 103b changes the selection of template from the template set for three images so that these orientations agree with one another. For example, in the example shown in FIG. 15, the template that is being applied to the left page is the template 3-HVH, in which the frame 15a for positioning of the third image is oriented as landscape. But the image 15b that has been added by the user is a portrait image, so that these two do not match. Due to this, the album creation section 103b re-selects the template 3-HVV from the template set for three images, and applies it to the left page that is the subject.

Figure 16:
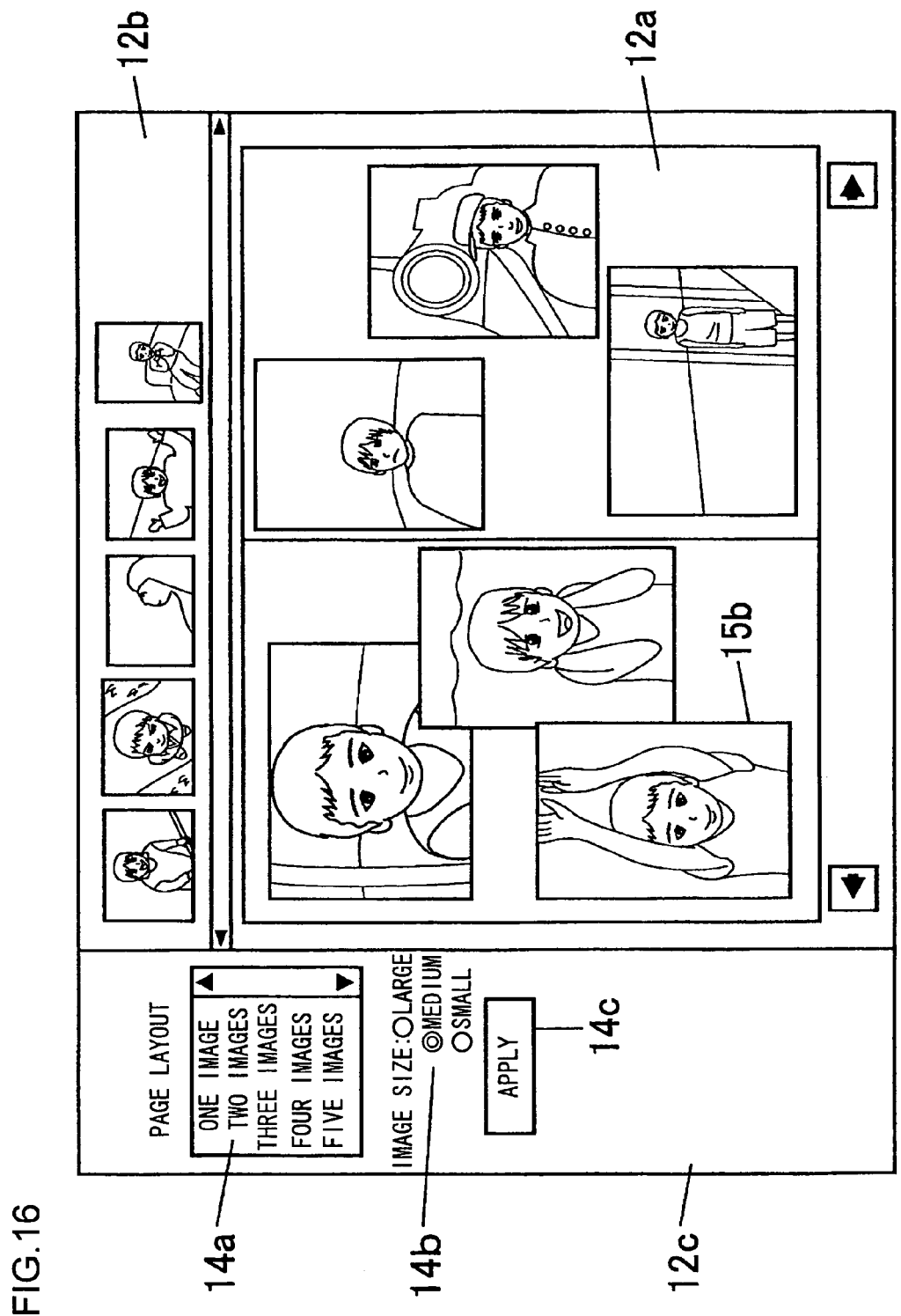
FIG. 16 is a fourth figure showing a concrete example of album editing, in the first embodiment.

By doing this, as shown in FIG. 16, it is possible to arrange the portrait image 15b that has been added by the user within the space for positioning the third image that has been added to the left page (i.e. within the frame 15a shown in FIG. 15), and moreover it is possible to apply the optimum template to the left page, taking into account the orientations of all the images that are to be arranged upon that page.

Figure 17:
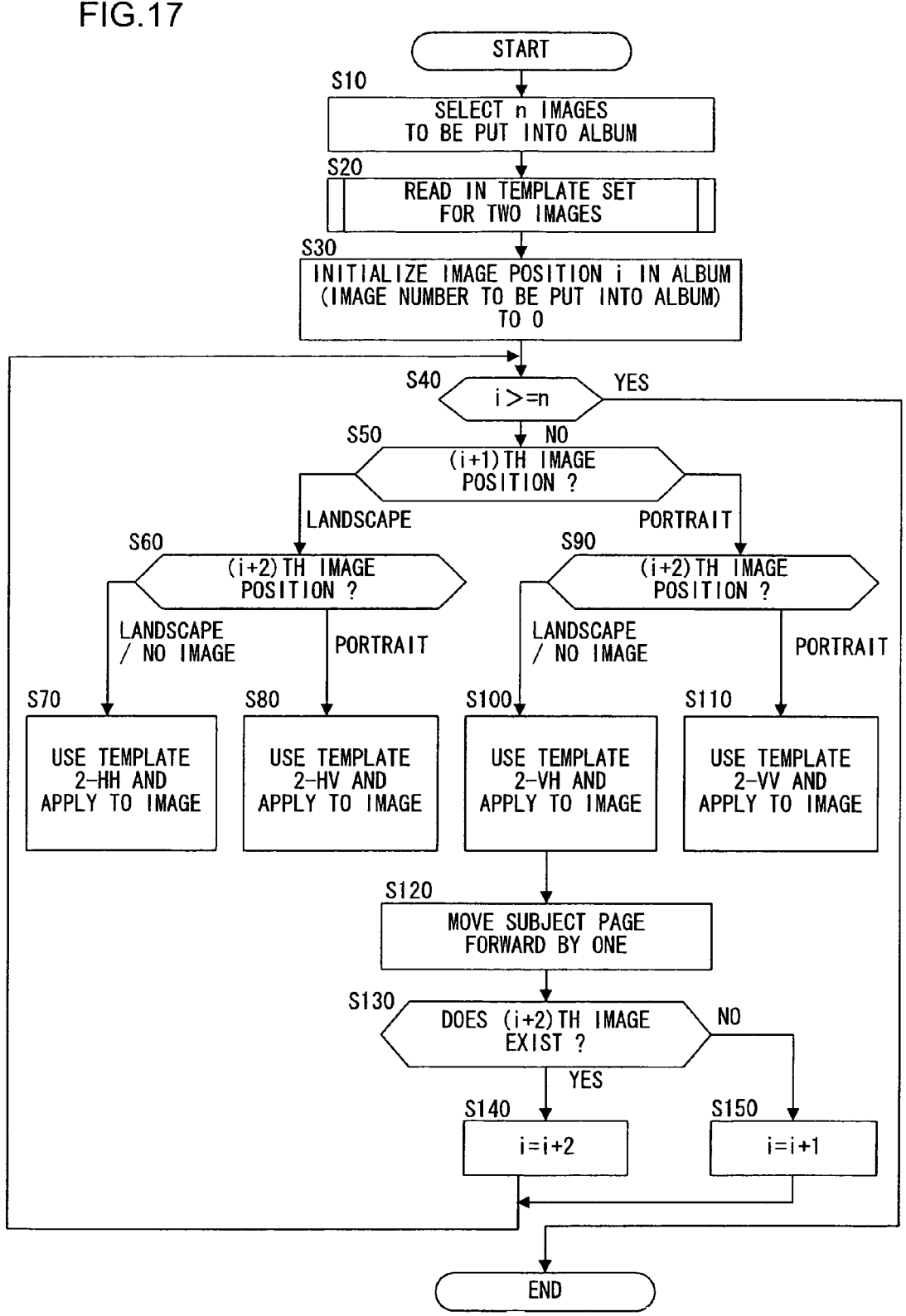
FIG. 17 is a flow chart showing the flow of album creation processing, in the first embodiment.

FIG. 17 is a flow chart showing the flow of album creation processing executed by the album creation section 103b in this first embodiment. The processing of FIG. 17 is executed as a program (an album creation program) that starts when a command is issued by the user for the start of creation of an album. It should be understood that, in this processing shown in FIG. 17, there is shown a case in which a plurality of images (n images) have selected by the user upon the screen for image selection shown in FIG. 2, and moreover a page layout for arranging two images upon each page, for example "A4 portrait: two on left page/two on right page", has been selected by the user on the screen for page layout selection shown in FIG. 3.

In a step S10, the album creation section 103b selects a plurality of images (n images) that have been selected by the user upon the screen for image selection shown in FIG. 2. Then the flow of control proceeds to a step S20, in which a template set for arranging two images upon one page, in other words the template set for two images shown in FIG. 7, is read in from the HDD 104. Then the flow of control proceeds to a step S30, in which an image number i for identifying the n images included in the album is initialized to zero, and then the flow of control proceeds to a step S40.

In this step S40, a decision is made as to whether or not the image number i is greater than or equal to the total number of images to be included in the album. If the result of this decision is affirmative, then it is decided that all of the n images have been arranged upon pages, and this processing terminates. By contrast, if the result of this decision is negative, then the flow of control proceeds to a step S50. In this step S50, the orientation (the image position) of the (i+1)th image is determined. If it is decided that the orientation of the (i+1)th image is landscape, in other words if the image position is landscape, then the flow of control proceeds to a step S60.

In this step S60, the orientation (the image position) of the (i+2)th image is determined. If it is decided that the orientation of the (i+2)th image is landscape, or if it is decided that an (i+2)th image does not exist, then the flow of control proceeds to a step S70, in which the template 2-HH is selected from the template set for two images, and this template 2-HH is applied for creation of a page. By contrast, if it is decided that the orientation of the (i+2)th image is portrait, then the flow of control proceeds to a step S80, in which the template 2-HV is selected from the template set for two images, and this template 2-HV is applied for creation of a page. Then the flow of control is transferred to a step S120 that will be described hereinafter.

On the other hand, if in the step S50 it is decided that the orientation of the (i+1)th image is portrait, then the flow of control is transferred to a step S90. In this step S90, the image position of the (i+2)th image is determined. If it is decided that the image position of the (i+2)th image is landscape, or if it is decided that an (i+2)th image does not exist, then the flow of control proceeds to a step S100, in which the template 2-VH is selected from the template set for two images, and this template 2-HH is applied for creation of a page. By contrast, if it is decided that the orientation of the (i+2)th image is portrait, then the flow of control proceeds to a step S110, in which the template 2-VV is selected from the template set for two images, and this template 2-VV is applied for creation of a page. Then the flow of control proceeds to the step S120.

In this step S120, the page created (the subject page) is advanced by one page, and then the flow of control proceeds to a step S130. In this step S130, a decision is made as to whether or not an (i+2)th image exists. If the result of this decision is affirmative, then 2 is added to i, and the flow of control returns to the step S40. By contrast, if the result of this decision is negative, then 1 is added to i, and the flow of control returns to the step S40.

Figure 18:
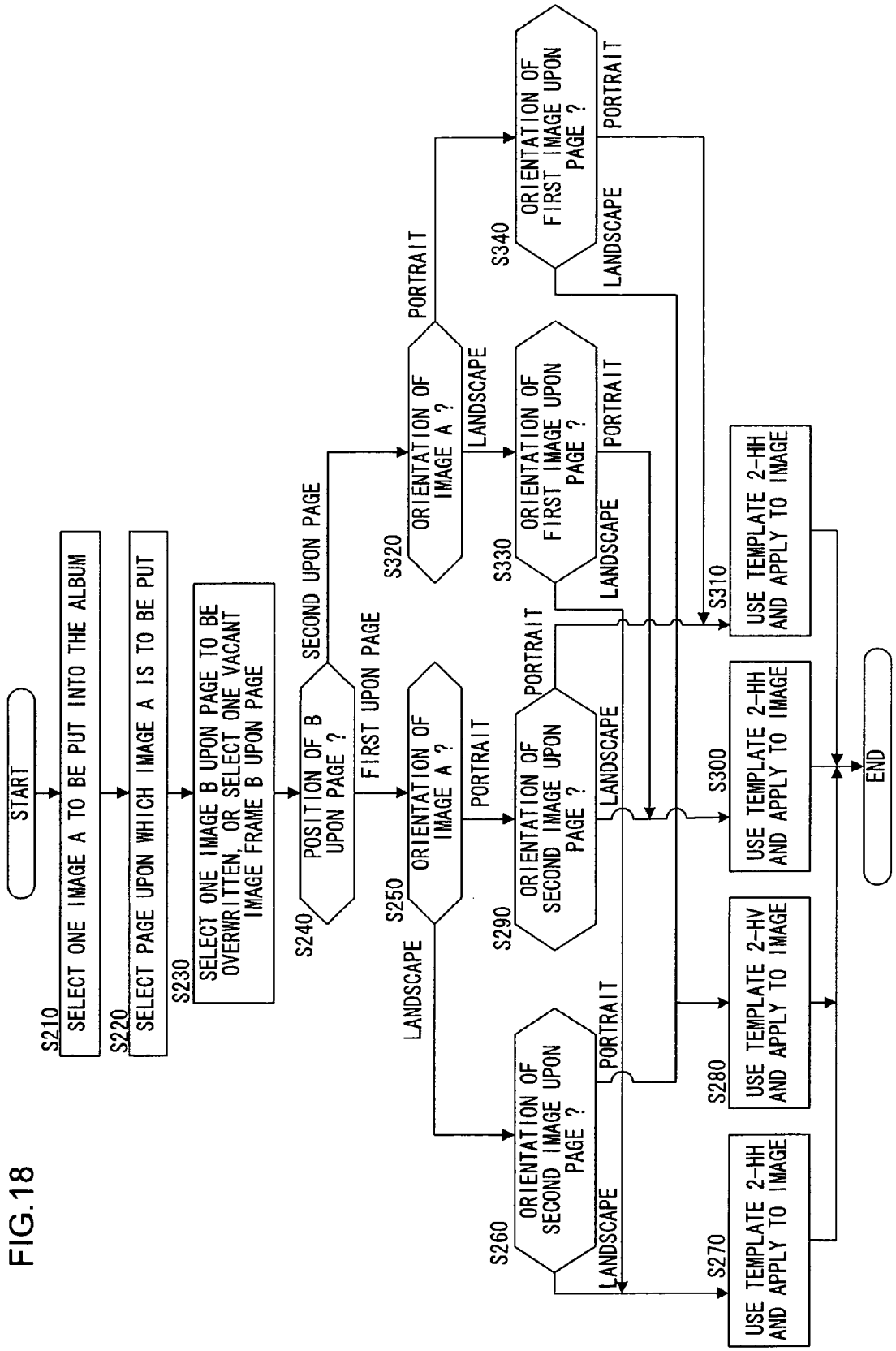
FIG. 18 is a flow chart showing the flow of album editing processing, in the first embodiment.

FIG. 18 is a flow chart showing the flow of album editing processing executed by the album creation section 103b in this first embodiment. The processing shown in FIG. 18 is executed as a program (an album editing program) that starts when, in order to edit an album that has been automatically created by the album creation section 103, any one of the thumbnail images being displayed upon the screen for album editing within the thumbnail image display region 12b is shifted by the user by drag and drop actuation to within the image display region 2a. It should be understood that the processing shown in FIG. 18 shows the case in which, due to the processing described above with reference to FIG. 17, an album has been created by arranging two images upon each page.

In a step S210, the one thumbnail image that has been shifted by the user from within the thumbnail image display region 12b is selected as an image A to be put into the album. Then the flow of control proceeds to a step S220, in which the page that was the destination upon which the thumbnail image was dragged and dropped by the user is selected as the page upon which the image A is to be put, and then the flow of control proceeds to a step S230. In this step S230, the image that was originally at the location where the thumbnail image was dragged and dropped by the user is selected as the image to be replaced, in other words as the image B that is to be overwritten. Or, if no original image is present at the location where dragging and dropping took place, then the blank white color frame that is present there is selected as the image frame B. Here, the term "shift destination B" will be used for the image B or the frame B. Then the flow of control proceeds to a step S240.

In the step S240, the position of the shift destination B upon the page is determined. In other words, it is decided whether the shift destination B is the first image or image frame upon the page, in other words whether it is the first upon the page, or whether it is the second image or image frame upon the page, in other words whether it is the second upon the page. If it is decided that the position upon the page of the shift destination B is the first upon the page, then the flow of control proceeds to a step S250.

In this step S250, a decision is made as to whether the orientation of the image A is portrait or landscape. If it is decided that the orientation is landscape, then the flow of control proceeds to a step S260, in which a decision is made as to whether the orientation of the second image upon the page is portrait or landscape. If it is decided that the orientation of the second image upon the page is landscape, then the flow of control proceeds to a step S270, in which the template 2-HH is selected from the template set for two images and is applied to the page that was selected in the step S220, and then this processing terminates. By contrast, if in the step S260 it is decided that the orientation of the second image upon the page is portrait, then the flow of control is transferred to a step S280, in which the template 2-HV is selected from the template set for two images and is applied to the page that was selected in the step S220, and then this processing terminates.

On the other hand, if in the step S250 it is decided that the orientation of the image A is portrait, then the flow of control is transferred to a step S290. In this step S290, a decision is made as to whether the orientation of the second image upon the page is portrait or landscape. If it is decided that the orientation of the second image upon the page is landscape, then the flow of control proceeds to a step S300, in which the template 2-VH is selected from the template set for two images and is applied to the page that was selected in the step S220, and then this processing terminates. By contrast, if in the step S290 it is decided that the orientation of the second image upon the page is portrait, then the flow of control is transferred to a step S310, in which the template 2-VV is selected from the template set for two images and is applied to the page that was selected in the step S220, and then this processing terminates.

Next, the processing will be explained for the case in which, in the step S240, it is decided that the position upon the page of the shift destination B is the second upon the page. In this case, the flow of control is transferred to a step S320, in which a decision is made as to whether the orientation of the image A is portrait or landscape. If it is decided that the orientation is landscape, then the flow of control proceeds to a step S330, in which a decision is made as to whether the orientation of the first image upon the page is portrait or landscape. If it is decided that the orientation of the first image upon the page is landscape, then the flow of control is transferred to the step S270 described above. By contrast, if it is decided that the orientation of the first image upon the page is portrait, then the flow of control is transferred to the step S280 described above.

On the other hand, if in the step S320 it is decided that the orientation of the image A is portrait, then the flow of control is transferred to a step S340. In this step S340, a decision is made as to whether the orientation of the first image upon the page is portrait or landscape. If it is decided that the orientation of the first image upon the page is landscape, then the flow of control is transferred to the step S300 described above. By contrast, if it is decided that the orientation of the first image upon the page is portrait, then the flow of control is transferred to the step S310 described above.

According to the first embodiment as explained above, the following beneficial operational effects may be obtained.

(1) It is arranged to determine whether the images to be the subjects for arrangement that have been selected by the user are portrait format images or landscape format images, to determine the orientations of these images that are to be the subjects for arrangement, and, on the basis of the result of this decision, to select as a subject template, from among a plurality of templates for image arrangement, a template for image arrangement that includes image arrangement region whose orientations agree with those of the images that are to be the subjects for arrangement. And it is arranged to create an album (images for display) by arranging the images that are to be the subjects for arrangement in the image arrangement regions within this selected subject template, and to display this album upon the monitor 105. By doing this, it is possible to create an album while selecting the optimum template, according to the orientations of the images.

(2) With regard to the templates, it is arranged to record upon the HDD 104 a template set consisting of a plurality of templates, for which the numbers of images that can be arranged are the same in each template. In other words, it is arranged to group together as one set a plurality of templates for which the numbers of images that can be arranged within each template are the same, and to record and store each of these sets of templates upon the HDD 104. By doing this, during album creation, it is possible to select the template set that includes the optimum template in a simple and easy manner, according to the number of images that are to be arranged upon one page, as selected by the user.

(3) It is arranged to select, as the subject template set, a template set that corresponds to the number of images to be arranged within each page (the number of images to be arranged) as set by the user, and to select, from this selected template set, that template in which to arrange the images. Due to this, it is possible to select the optimum template from the template set, according to the orientations of the images that are to be arranged.

(4) It is arranged for it to be possible, on the screen for album editing, to change the number of images to be arranged upon each page, and, if the number of images to be arranged has changed, for it to be possible to re-select the template set so that it corresponds to the number of images to be arranged after change. Due to this, the user is able to change the page layout freely, even after the album has been created.

(5) It is arranged to group together the template sets while also taking into account the size of the images to be arranged, in other words the size of the image arrangement regions. Due to this, the user is able to select the size of the images to be arranged upon each page, and it is possible for the user to create an album by applying that template that is optimum according to the size for the images that he has selected.

(6) It is arranged to display the pages two at a time upon the screen for album editing, left and right together in a double page spread format. Due to this, it is possible for the user to check the details of the album that he has created while experiencing the feeling that it is a real album.

(7) It is arranged for it to be possible for the user to change the images that are arranged upon the page, by replacing, on the screen for album editing, an image that has already been positioned and that is being displayed within an image display region 2a, with another image whose thumbnail image is being displayed within the thumbnail image display region 12b. And, if an image has been thus changed, it is arranged to re-select and apply a template that matches the new image orientation after the change. Due to this, the user is able freely to change the images that are included in an album, after having checked the result of creation of the album, and it is possible for him to re-create a page in the optimum layout even if he has performed a change thereupon.

(8) It is arranged for the screen for album editing to consist of the image display region 2a (the first region) for displaying the pages (the images for display) of the album that has been created, the thumbnail image display region 12b (the second region) for displaying thumbnail images of the images that can be replaced for images arranged in the image display region 2a, and the layout selection region 12c (the third region) in which objects for changing are arranged, that is for receiving changes of layout of the images arranged upon the page, such as the number of images and so on. Due to this, the user is able to perform checking of each page, changing of the images, and changing of the layout upon a single screen, so that the convenience of use is enhanced.

Second Embodiment

In the first embodiment described above, a case was explained in which an album was created by selecting the optimum template from a template set that was prepared in advance, according to the orientations of the selected images, and by applying that template. By contrast, in the second embodiment, a case will be explained in which it is arranged for the user to be able to select a template that he desires to be applied from a template set prepared in advance, and in which an album is created by automatically selecting the images to be arranged upon each page, according to the template selected by the user.

It should be understood that, in this second embodiment, explanations for a figure showing a block diagram like FIG. 1, the screen for image selection like FIG. 2, and figures showing concrete examples of templates like FIGS. 4 through 11, are omitted, since these figures are similar to those for the first embodiment.

On the screen for image selection shown in FIG. 2, in a similar manner to the case for the first embodiment, the user operates the operation members 101, and selects images that he desires to include in the album from the image list displayed in the image display region 2a. Then, at the time point that he has completed the selection of images, he presses the "create album" button 2c. It should be understood that, in this case as well, the user is able to press the "create album" button 2c without having selected even one image from within the image display region 2a. In this case, a page only consisting of a blank white field is displayed upon a screen for album editing that will be described hereinafter with reference to FIG. 20.

When the "create album" button 2c is pressed by the user, the display control section 103a outputs the screen for page layout selection shown in FIG. 19 to the monitor 105, thus displaying that screen. This screen for page layout selection shown in FIG. 19 includes a page layout selection region 19a, an image size selection button 19b, an "OK" button 19c, and a "cancel" button 19d.

Information related to page layouts for albums that can be selected by the user is displayed as a list in the page layout selection region 3a. As such information related to page layout, in a similar manner to the case with the first embodiment, it is made possible for the user to select the size of the background paper (A4, B5, or the like), the direction of orientation of the background paper (portrait or landscape), and the number of images to be arranged upon each page. Moreover, in this embodiment, it is also made possible for the user to select the orientation of each of the images to be arranged upon the pages.

For example, if the user wishes to set the background paper to A4 portrait, and to arrange two portrait images upon the left page and two landscape images upon the right page, then he selects "A4 portrait: two on left page (portrait, portrait)/two on right page (landscape, landscape)" from the list displayed in the page layout selection region 3a. Furthermore, if he wants to arrange the images on both the left and right pages so that the first is a portrait image and the second is a landscape image, then he selects "A4 portrait: two on left page (portrait, landscape)/two on right page (portrait, landscape)".

Furthermore, by operating the image size selection button 3b upon this screen for page layout selection, the user is able to select the size of the images to be arranged upon each page (to either "large", "medium", or "small"). When the user presses the "OK" button after having making these selections, the album creation section 104b reads in from the HDD 104 the template set that includes the optimum template according to the page layout that was selected upon the screen for page layout selection shown in FIG. 19, and creates an album by arranging the images that were selected by the user upon the screen for image selection of FIG. 2 over this optimum template.

By way of example, the case will now be explained in which, upon the screen for page layout selection, the user has selected "A4 portrait: two on left page (portrait, portrait)/two on right page (landscape, landscape)" as the page layout, and has then pressed the "OK" button 3c after having selected "medium" as the image size. In this case, the album creation section 103b reads in from the HDD 104 the template set for two images for the case of image size "medium" shown in FIG. 7 for the first embodiment. And it selects the template 2-VV as the template to be applied to the left page, and the template 2-HH as the template to be applied to the right page.

And the album creation section 103b creates a left page and a right page by applying the selected template. And it determines the orientations for the images selected by the user, and arranges these images within the image frames upon the page according to their orientations. In other words, a landscape image comes to be arranged upon a right page that has been created by applying the template 2-HH that is capable of arranging a landscape image, while a portrait image comes to be arranged upon a left page that has been created by applying the template 2-VV that is capable of arranging a portrait image. By doing this, it is possible to create an album by automatically arranging the images selected by the user upon those pages upon which images of that orientation can be arranged.

Figure 20:
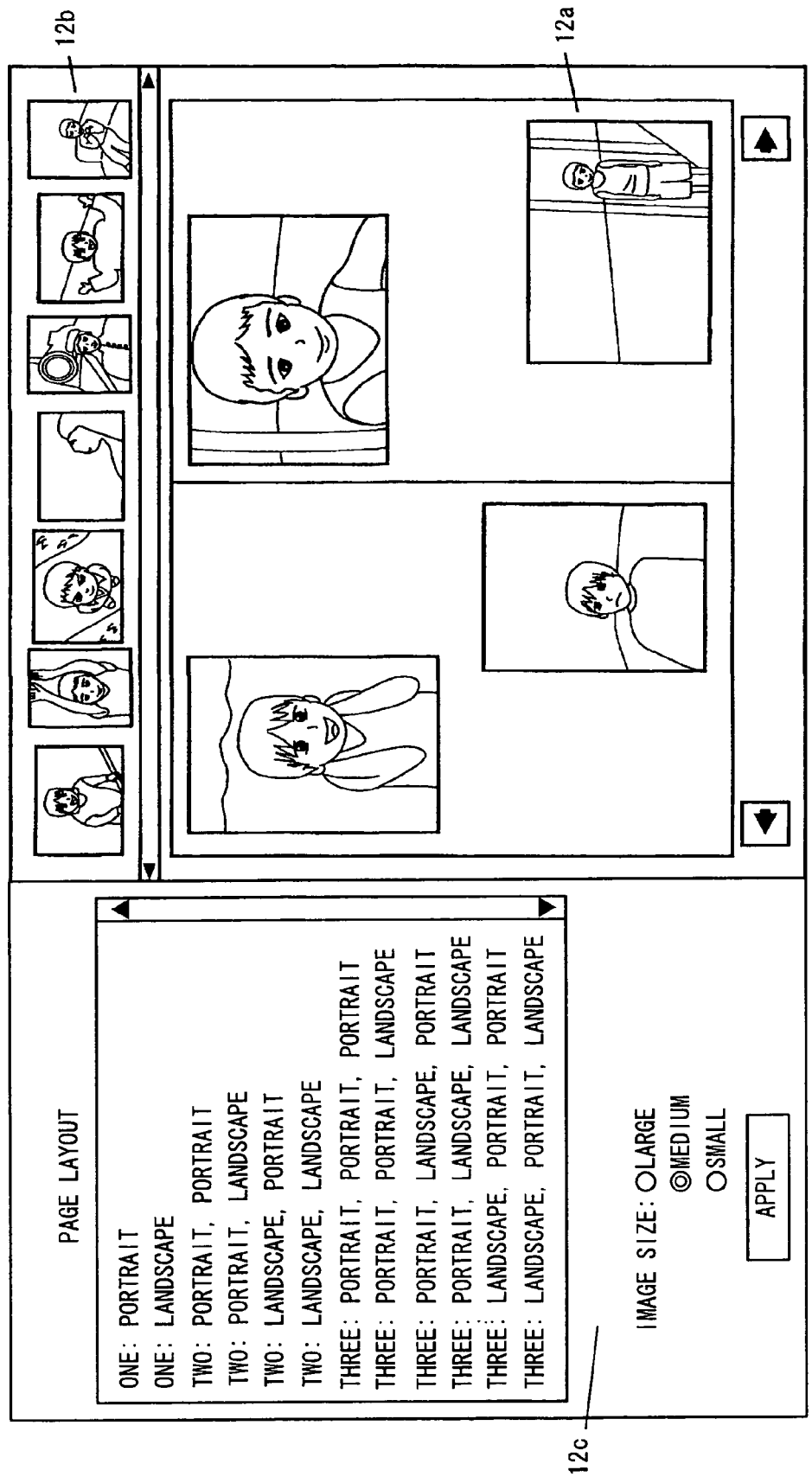
FIG. 20 is a figure showing a concrete example of a screen for album editing, in the second embodiment.

And, as shown in FIG. 20, the display control section 103a outputs to the monitor 105 a screen for album editing, in which the layout of a two page spread of the album created by the album creation section 103b is displayed. FIG. 20 is a figure showing a concrete example of this screen for album editing, when the template 2-VV has been applied to the left page and the template 2-HH has been applied to the right page. This screen for album editing is divided into three regions: a layout display region 12a, a thumbnail image display region 12b, and a layout selection region 12c. It should be understood that explanation of the details displayed in each of these regions 12a through 12c is omitted, since it is similar to the case for the first embodiment.

On this screen for album editing, in a similar manner to the case for the first embodiment, by performing dragging and dropping using the mouse so as to shift any one of the thumbnail images being displayed in the thumbnail image display region 12b and drop it onto any one of the images in the image display region 2a, the user is able to replace the image that is the destination of shifting with the image whose thumbnail image has thus been shifted. At this time, since in this embodiment the orientations of the images that can be arranged upon each page are already determined, it is arranged to provide a display in the thumbnail image display region 12b in which the thumbnail images that the user can shift to each page are limited to only those images that can be arranged upon the page of the shift destination.

Figure 21:
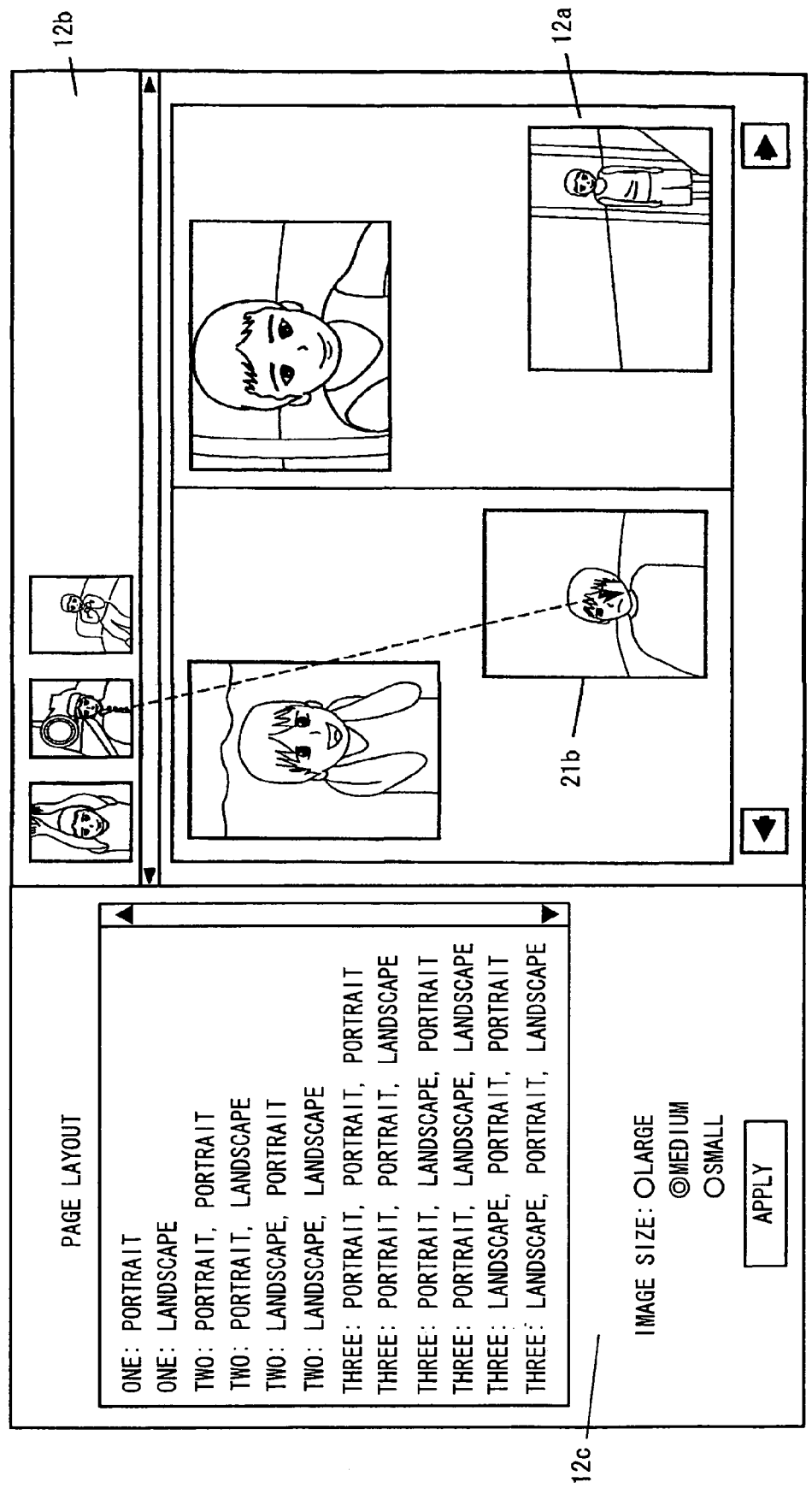
FIG. 21 is a first figure showing a concrete example of album editing, in the second embodiment.

In concrete terms, when the user is to perform replacement of an image, first he selects the page to be the destination of shifting by clicking on it with the mouse. And, when a left page or a right page is selected by the user, the display control section 103a decides upon the orientations of the images that can be arranged upon the selected page, and limits the thumbnail images displayed in the thumbnail image display region 12b to only the thumbnail images for those images that are so oriented that they can be arranged upon the selected page. For example, as shown in FIG. 21, if the user has selected a left page as the page to be the destination of shifting, then it is arranged for the display control section 103a to display in the thumbnail image display region 12b only thumbnails for those images that can be arranged upon a left page, in other words only thumbnails for portrait images. By doing this, it is made possible for the user to select an image that can be shifted to the page that is the destination of shifting in a simple and easy manner.

Figure 22:
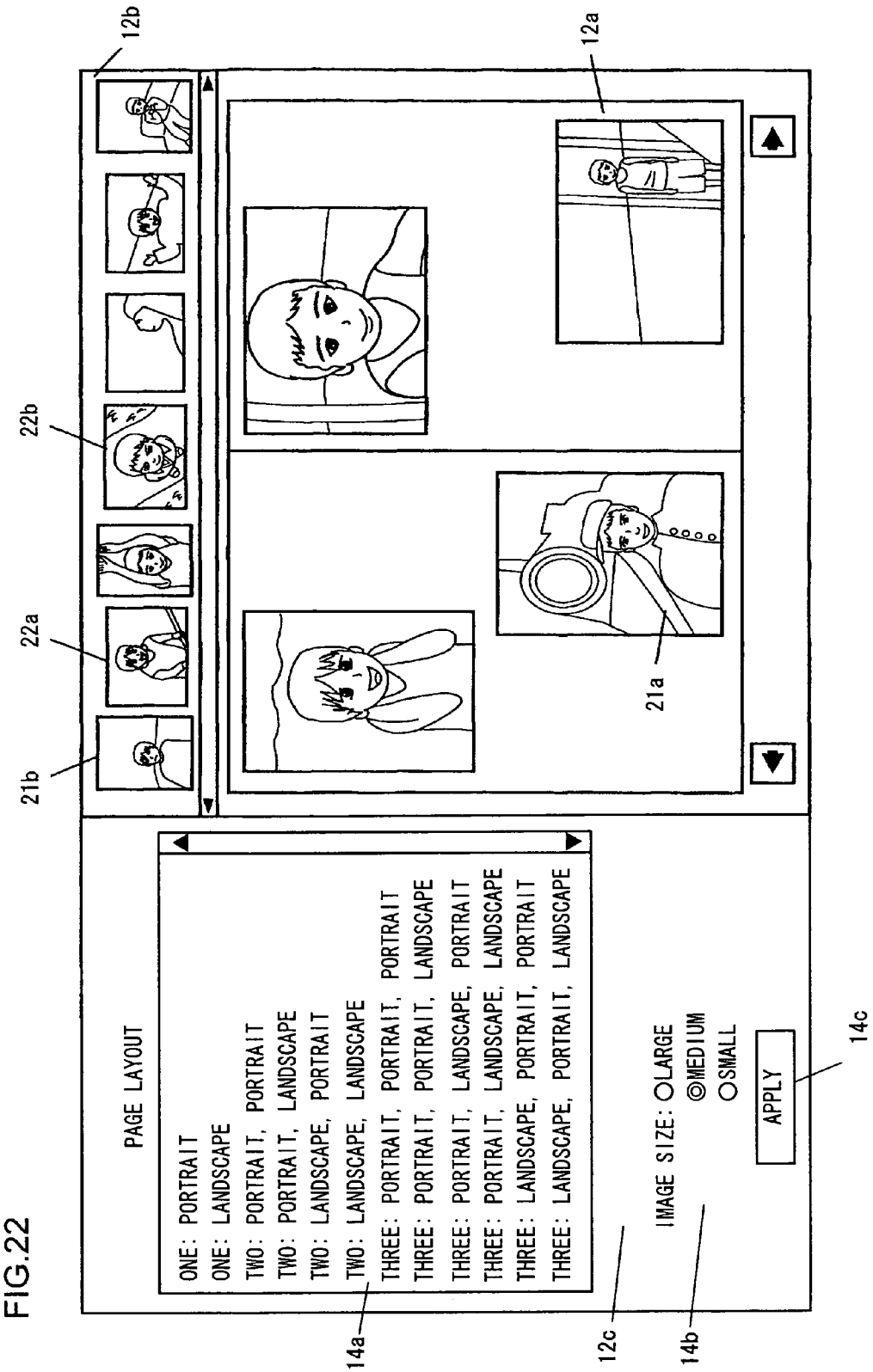
FIG. 22 is a second figure showing a concrete example of album editing, in the second embodiment.

And, as shown in FIG. 21, for example, by performing dragging and dropping so as to shift one of the thumbnail images displayed within the thumbnail image display region 12b, for example the thumbnail image 21a, over one of the images arranged upon the left page, for example the image 21b, the user is able to replace the image 21b with the image 21a. The screen for album editing after this replacement of the image has been performed is shown in FIG. 22.

Furthermore, on this screen for album editing, in a similar manner to the case with the first embodiment, the user is able to change the layout of a page by operating an object provided in the layout selection region 12c. When the layout has thus been changed by the user, the album creation section 103b changes the template that is applied to each page to one that matches the layout after change. It should be understood that, in a similar manner to the case with the first embodiment, an object for changing the number of images 14a, an object for changing the image size 14b, and an "apply" button 14c are provided in this layout selection region 12c.

As an example, a case will be explained in which, on the screen for album editing shown in FIG. 22, the user has selected the left page by clicking the mouse within the left page in the image display region 2a, and has actuated the object for changing the number of images 14a so as to change the number of images to "3: landscape, portrait, landscape". In this case, the album creation section 103b reads in the template set for three images from the HDD 104, and applies to the left page the template 3-HVH that is included therein. By doing this, on the left page, it becomes possible to arrange a landscape image as the first image, a portrait image as the second image, and a landscape image as the third image.

Figure 23:
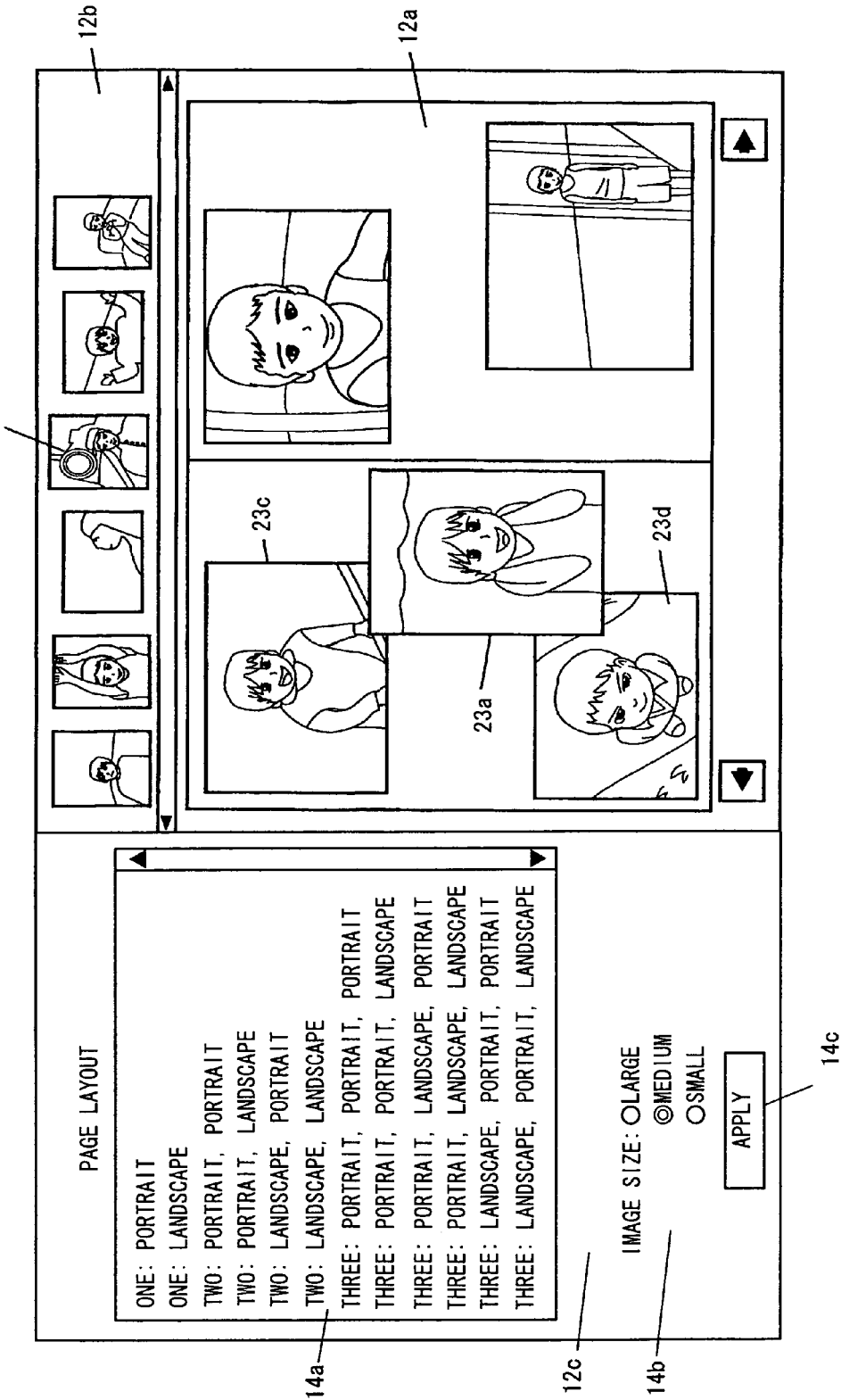
FIG. 23 is a third figure showing a concrete example of album editing, in the second embodiment.

Now, since up until now two portrait images were arranged upon the left pages, it becomes impossible to arrange just one portrait image here after this change of the layout. Moreover, it now becomes possible to arrange two landscape images upon the left pages. Accordingly, together with this change of the layout of the left page, the album creation section 103b re-selects the images to be arranged upon the left page in the following manner. A concrete example will now be explained using FIG. 23.

First, among the two portrait images that were arranged up until now, the album creation section 103b puts the first portrait image 23a as the second image in the new layout. And the other portrait image is eliminated from the subjects of arrangement, and it is displayed within the thumbnail image display region 12b (as a thumbnail image 23b). Next, the album creation section 103b selects from within the folder some landscape images that have not yet been arranged in the album, and arranges them within the two frames that have been newly added.

For example, the landscape image 22a that was being displayed in the thumbnail image display region 12b may be arranged as the first image 23c on the left page, while the landscape image 22b that was being displayed in the thumbnail image display region 12b may be arranged as the third image 23d on the left page. By doing this, in response to change of the page layout by the user, it is possible to re-create the page by automatically arranging the images to match the layout after it has been changed.

Figure 24:
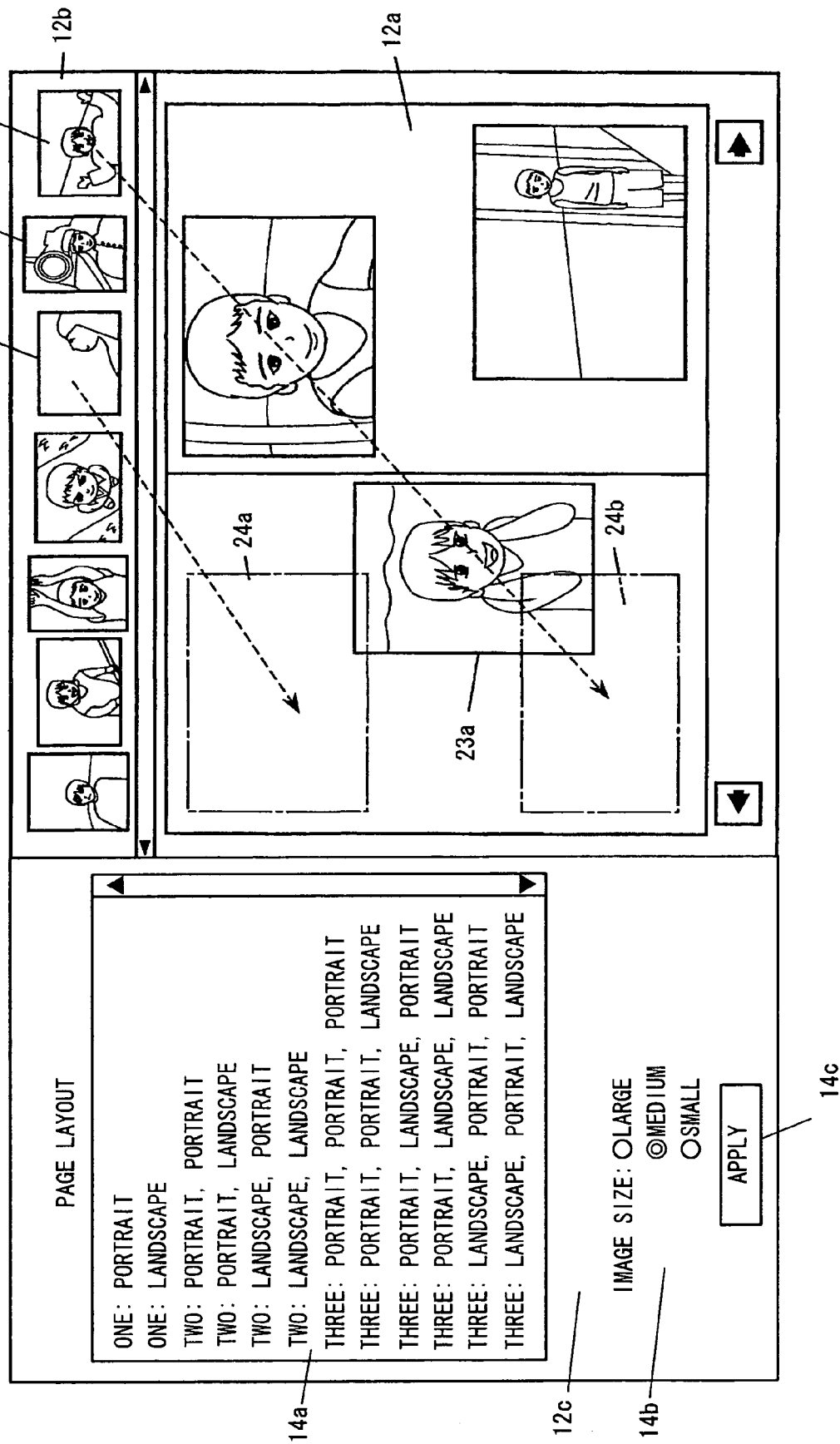
FIG. 24 is a fourth figure showing a concrete example of album editing, in the second embodiment.
Figure 25:
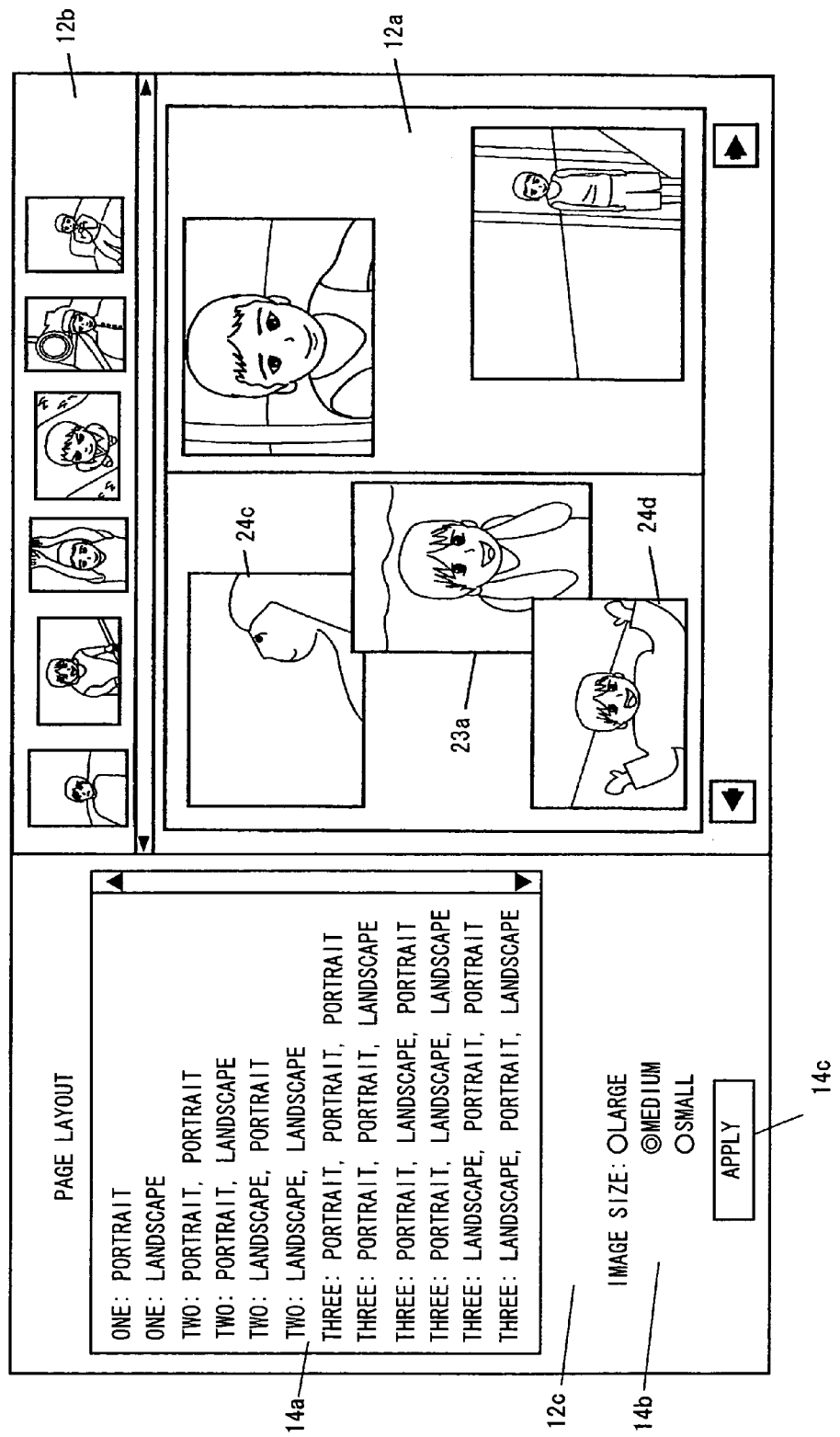
FIG. 25 is a fifth figure showing a concrete example of album editing, in the second embodiment.

Now, using FIGS. 24 and 25, an example will be explained of another change of layout, when the number of images to be arranged upon the left page has been changed by the user to "3: landscape, portrait, landscape". That is, as shown in FIG. 24, the album creation section 103b, along with arranging the first portrait image 23a of the two portrait images that were arranged up until now as the second image of the new layout, also blanks out two frames (image frames) 24a and 24b that have been newly added. It should be understood that, in this case as well, the other one of the portrait images that has been eliminated from the subjects for arrangement is displayed within the thumbnail image display region 12b (the thumbnail image 23b).

And, on the screen for album editing shown in FIG. 24, the user selects from the thumbnail image display region 12b images whose orientations are the same as those of the image frame 24a and the image frame 24b, and shifts them by dragging and dropping to within these frames. For example, he may select the thumbnail image 24c from the thumbnail image display region 12b and may shift it to within the image frame 24a, and may select the thumbnail image 24d and shift it to within the image frame 24b. By doing this, as shown in FIG. 25, it is possible to arrange the landscape image 24c as the first image, and to arrange the landscape image 24d as the third image.

A difference from the case of the procedure described above with reference to FIG. 23 is that, in the case of this procedure, there is the merit that it is possible to select any images that the user desires and to arrange them in the space that has been vacated due to increase of the number of images arranged upon the page. Furthermore, in FIG. 24, it would also be acceptable, when the user selects the shift destination image frame 24a or 24b in advance, to arrange to extract and to display, within the thumbnail image display region 12b, only those images whose orientations match the orientation of that image frame.

It should be understood that, as the method of changing the layout when the number of images upon a page has been changed, it would be acceptable to set in advance either the method of change described above with reference to FIG. 23, or the method of change described above with reference to FIGS. 24 and 25; or it would also be acceptable to arrange for the user to select one or the other of these methods, as he wishes.

Figure 26:
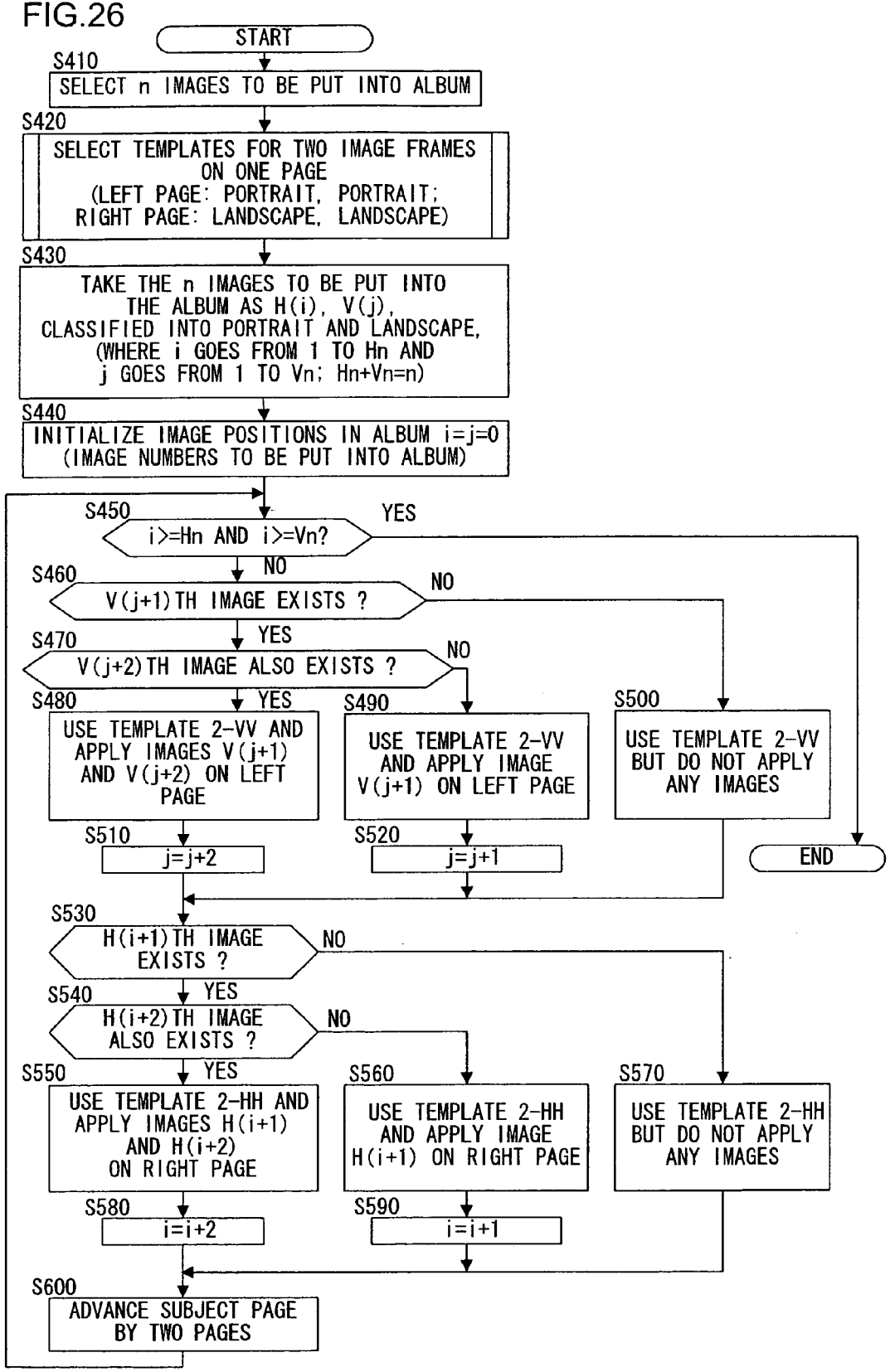
FIG. 26 is a flow chart showing the flow of album creation processing, in the second embodiment.

FIG. 26 is a flow chart showing the flow of album creation processing executed by the album creation section 103b in this second embodiment. The processing shown in FIG. 26 is executed by a program (an album creation program) that starts when the start of creation of an album is commanded by the user. It should be understood that, in the processing shown in FIG. 26, there is shown processing for when a plurality of images (n images) are selected by the user on the screen for image selection shown in FIG. 2, and moreover "A4 portrait: two on left page (portrait, portrait)/two on right page (landscape, landscape)" has been selected as the page layout by the user on the screen for page layout selection shown in FIG. 19.

In a step S410, the album creation section 103b selects the plurality of images (n images) that have been selected by the user upon the screen for image selection shown in FIG. 2. Then the flow of control proceeds to the step S420, in which the template set for arranging two images upon one page, in other words the template set for two images shown in FIG. 7, is read in from the HDD 104. And, from among this template set for two images that has been read in, 2-VV is selected as the template to be applied to the left page, while 2-HH is selected as the template to be applied to the right page.

Then the flow of control proceeds to a step S430, in which the n images that have been selected are classified into landscape images (that extend horizontally) and portrait images (that extend vertically): the landscape images will be referred to as $H(i)$ while the portrait images will be referred to as $V(j)$. It should be understood that i is a numerical value that expresses the image numbers of the landscape images, and the range that it can take is 0~Hn. Moreover, j is a numerical value that expresses the image numbers of the portrait images, and the range that it can take is 0~Vn. And the relationship $Hn+Vn=n$ holds.

Then the flow of control proceeds to a step S440, in which i and j described above are initialized to zero, and then the flow of control proceeds to a step S450. In this step S450, a decision is made as to whether or not the image number i for the landscape images is greater than or equal to Hn, and also the image number j for the portrait images is greater than or equal to Vn. If the result of this decision is affirmative, then it is decided that all of the landscape images and also all of the portrait images have been arranged upon pages, and this processing terminates. By contrast, if the result of this decision is negative, then the flow of control proceeds to a step S460.

In this step S460, a decision is made as to whether or not a portrait image $V(j+1)$, in other words a $(j+1)$th portrait image, exists. If the result of this decision is negative, then the flow of control proceeds to a step S500, in which the template 2-VV is selected from the template set for two images, and a left page is created without arranging images in the image frames upon that page. In other words, a left page is created in blank white color. Then the flow of control is transferred to a step S530 that will be described hereinafter. By contrast, if the result of the decision is affirmative, then the flow of control proceeds to a step S470.

In this step S470, a decision is made as to whether or not a portrait image $V(j+2)$, in other words a $(j+2)$th portrait image, also exists. If the result of this decision is negative, then the flow of control proceeds to a step S490, in which the template 2-VV is selected from the template set for two images, and a left page is created with the portrait image $V(j+1)$ arranged thereupon as the first image. Then the flow of control proceeds to a step S520, in which 1 is added to the image number j for the portrait images, and then the flow of control proceeds to the step S530 that will be described hereinafter.

On the other hand, if an affirmative decision has been reached in the step S470, then the flow of control proceeds to a step S480. In this step S480, the template 2-VV is selected from the template set for two images, and a left page is created with the portrait image $V(j+1)$ arranged thereupon as the first image and with the portrait image $V(j+2)$ arranged thereupon as the second image. Then the flow of control proceeds to a step S510, in which 2 is added to the image number j for the portrait images, and then the flow of control proceeds to the step S530.

In this step S530, a decision is made as to whether or not a landscape image $H(i+1)$, in other words an $(i+1)$th landscape image, exists. If the result of this decision is negative, then the flow of control proceeds to a step S570, in which the template 2-HH is selected from the template set for two images, and a right page is created without arranging images in the image frames upon that page. In other words, a right page is created in blank white color. Then the flow of control is transferred to a step S600 that will be described hereinafter. By contrast, if the result of the decision is affirmative, then the flow of control proceeds to a step S540.

In this step S540, a decision is made as to whether or not a landscape image $H(i+2)$, in other words an $(i+2)$th landscape image, also exists. If the result of this decision is negative, then the flow of control proceeds to a step S560, in which the template 2-HH is selected from the template set for two images, and a right page is created with the portrait image H(i+1) arranged thereupon as the first image. Then the flow of control proceeds to a step S590, in which 1 is added to the image number i for the landscape images, and then the flow of control proceeds to the step S600 that will be described hereinafter.

On the other hand, if an affirmative decision has been reached in the step S540, then the flow of control proceeds to a step S550. In this step S550, the template 2-HH is selected from the template set for two images, and a right page is created with the portrait image H(i+1) arranged thereupon as the first image and with the portrait image H(i+2) arranged thereupon as the second image. Then the flow of control proceeds to a step S580, in which 2 is added to the image number i for the landscape images, and then the flow of control proceeds to the step S600. In this step S600, the created page (the subject page) is advanced by two pages, and then the flow of control returns to the step S450.

Figure 27:
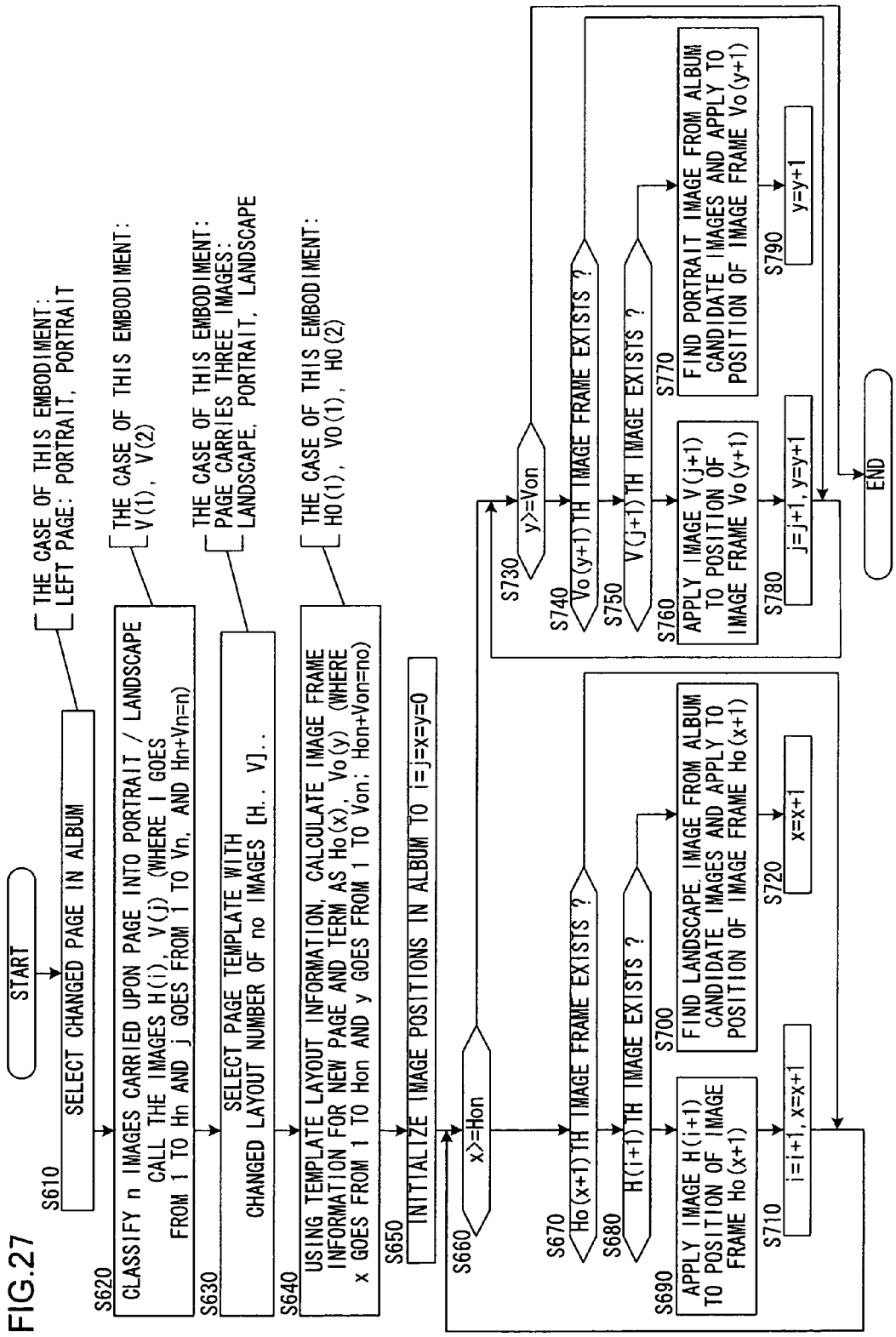
FIG. 27 is a flow chart showing the flow of album editing processing, in the second embodiment.

FIG. 27 is a flow chart showing the flow of album editing processing executed by the album creation section 103b in this second embodiment. The processing shown in FIG. 27 is executed as a program (an album editing program) that starts when, in order to edit an album that has been created automatically be the album creation section 103, the object for changing the number of images 14a on the screen for album editing is operated by the user, and the number of images is changed.

In a step S610, the album creation section 103 decides whether any page in the image display region has been clicked upon by the user, and selects the page upon which the layout is changed. Then the flow of control proceeds to a step S620, in which the images (n images) that are arranged upon the page that has become the subject of layout change are classified into landscape images (that are more extended horizontally) and portrait images (that are more extended vertically): the landscape images will be referred to as H(i) while the portrait images will be referred to as V(j). It should be understood that is a numerical value expressing the image numbers of the landscape images, and the range that it can take is 0~Hn. Moreover, j is a numerical value expressing the image numbers of the portrait images, and the range that it can take is 0~Vn. And the relationship Hn+Vn=n holds.

Then the flow of control proceeds to a step S630, in which a template is selected by the user for arranging the number of images after change by the object for changing the number of images 14a being operated (no images), each in its own image orientation. For example, if the number of images has been changed by the user to "three: landscape, portrait, landscape", then the template 3-HVH is selected from the template set for three images. Then the flow of control proceeds to a step S640.

In this step S640, image frame information for the page after change is calculated on the basis of the layout information of the template that was selected in the step S630. That is, the landscape orientation image frames are taken as being Ho(x), while the portrait orientation image frames are taken as being Vo(y). It should be understood that x is a numerical value that expresses the numbers of the image frames that are oriented as landscape, and the range that it assumes is 0~Hon. Moreover, y is a numerical value that expresses the numbers of the image frames that are oriented as portrait, and the range that it assumes is 0~Von. Moreover, the relationship Hon+Von=no holds. For example, if the template selected in the step S630 is the template 3-HVH, then a landscape image frame Ho(1), a portrait image frame Vo(1), and a landscape image frame Ho(2) are calculated as being the image frame information for the page after change.

Then the flow of control proceeds to a step S650, in which the above described i, j, x, and y are initialized to zero, and then the flow of control proceeds to a step S660. In this step S660, a decision is made as to whether or not x is greater than or equal to Hon. If the result of this decision is negative, then the flow of control proceeds to a step S670, in which a decision is made as to whether or not a landscape image frame Ho(x+1) is present upon the page, in other words as to whether or not an (x+1)th landscape image frame exists. If the result of this decision is negative, then the flow of control returns to the step S660. By contrast, if the result of this decision is affirmative, then the flow of control proceeds to a step S680.

In this step S680, a decision is made as to whether or not a landscape image H(i+1) is present among the images arranged upon the page that is the subject of layout change, in other words as to whether or not an (i+1)th landscape image exists. If the result of this decision is negative, then the flow of control is transferred to a step S700, in which a landscape image is found from the images not yet arranged upon a page in the album (i.e. from the album candidate images), and this image is arranged in the landscape image frame Ho(x+1). Then the flow of control is transferred to a step S720, in which 1 is added to x, and then the flow of control returns to the step S660. By contrast, if the result of this decision is affirmative, then the flow of control is transferred to a step S690, in which the landscape image H(i+1) is arranged within the landscape image frame Ho(x+1), and then the flow of control is transferred to a step S710. In this step S710, both i and x are increased by 1, and then the flow of control returns to the step S660.

On the other hand, if the result of the decision in the step S660 is negative, then the flow of control is transferred to a step S730. In this step S730, a decision is made as to whether or not y is greater than or equal to Von. If the result of this decision is affirmative, then processing terminates. By contrast, if the result of this decision is negative, then the flow of control proceeds to a step S740, in which a decision is made as to whether or not a portrait image frame Vo(y+1) is present upon the page, in other words as to whether or not a (y+1)th portrait oriented image frame exists. If the result of this decision is negative, then the flow of control returns to the step S730. By contrast, if the result of this decision is affirmative, then the flow of control proceeds to a step S750.

In this step S750, a decision is made as to whether or not a portrait image V(j+1) is present among the images arranged upon the page that is the subject of layout change, in other words as to whether or not an (j+1)th landscape [sic] image exists. If the result of this decision is negative, then the flow of control is transferred to a step S770, in which a portrait image is found from the images not yet arranged upon a page in the album (i.e. from the album candidate images), and this image is arranged in the portrait image frame Vo(y+1). Then the flow of control is transferred to a step S790, in which 1 is added to y, and then the flow of control returns to the step S730. By contrast, if the result of this decision is affirmative, then the flow of control is transferred to a step S760, in which the portrait image V(j+1) is arranged within the portrait image frame Vo(y+1), and then the flow of control is transferred to a step S780. In this step S780, both j and y are increased by 1, and then the flow of control returns to the step S730.

According to the second embodiment as explained above, in addition to the advantageous effects of the first embodiment, it is also possible to obtain the advantageous effect described below. That is, it is arranged to create each page in the album by deciding upon the orientations of the images that can be arranged upon the template selected by the user, to select and by arranging images having the same image orientation that can be arranged in the template from among the images selected by the user as subjects for arrangement. By doing this, it is possible to create an album while selecting, for each page, images matching the layout that is supplied by the template.

Variant Embodiments

It should be understood that the image display devices of the embodiments described above may also be varied as described below.

(1) In the first and second embodiments described above, methods of creating an album using a template set were described. However, it is also possible to apply the present invention to some application other than the creation of an album, provided that it involves the arrangement of images by using a template set that is provided in advance. For example, the present invention can also be applied in a case in which one or a plurality of images are to be arranged upon one screen using a template, and a slide show is to be played by displaying these screens in order upon a monitor. A concrete example of this application will now be explained with reference to FIGS. 28 through 33. It should be understood that, when the present invention is applied to the case of playing a slide show in this manner, it is necessary to provide the control device 103 with a slide show image creation section for creating a slide show images, instead of providing the album creation section 103b.

Figure 28:
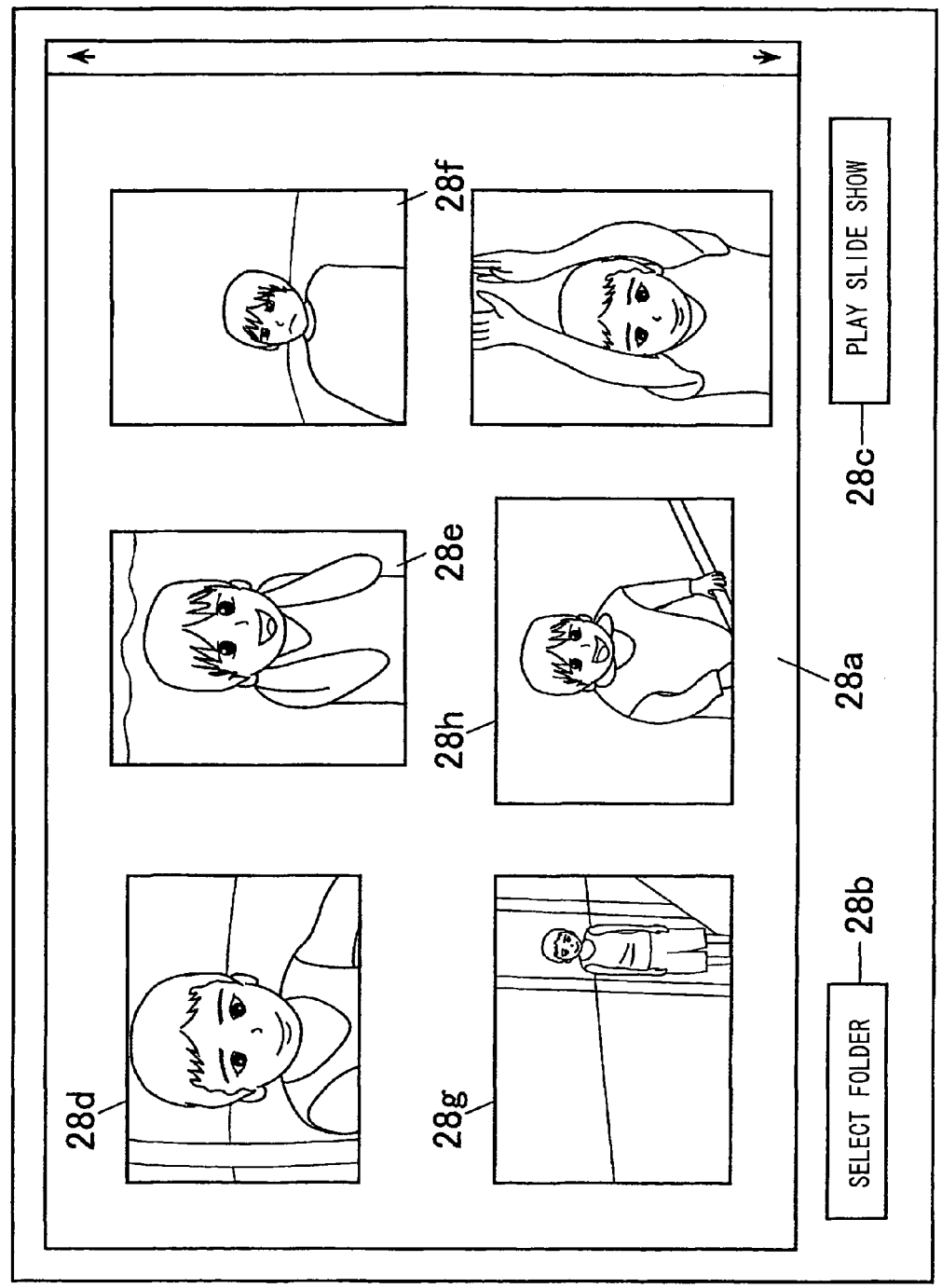
FIG. 28 is a figure showing a concrete example of a screen for slide show image selection, in a variant embodiment (1)
Figure 29:
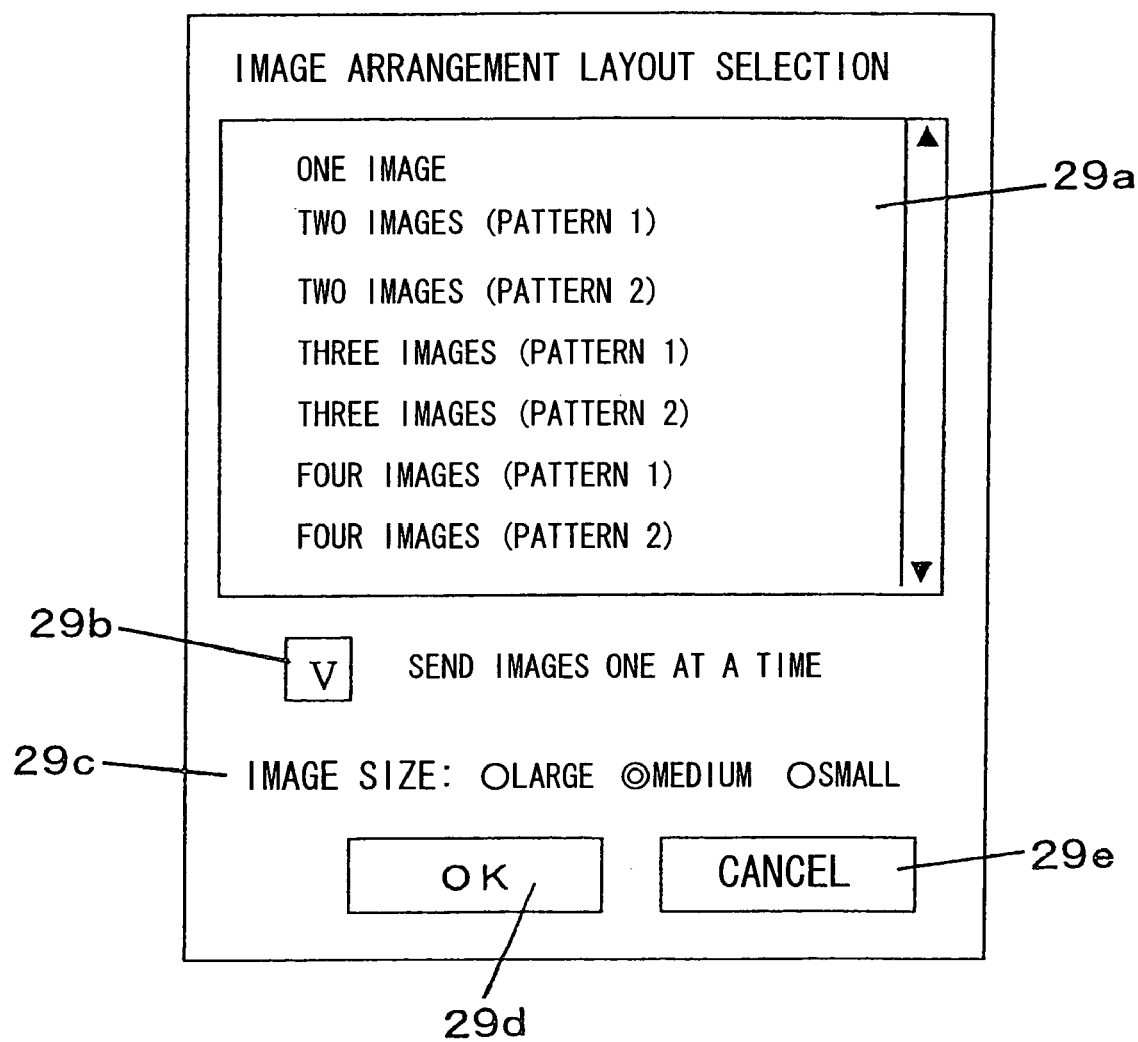
FIG. 29 is a figure showing a concrete example of a screen for layout selection, in this variant embodiment (1)

When the user commands the execution of a slide show, the display control section 103a outputs the screen for slide show image selection shown in FIG. 28 to the monitor 105, thus displaying it. This screen for slide show image selection includes an image display region 28a, a "select folder" button 28b, and a "play slide show" button 28c. Here, since the details of the images displayed in the image display region 2a are the same as in the case of the first embodiment shown in FIG. 2, accordingly explanation thereof will be omitted. Moreover, since the operation when the "select folder" button 28b is pressed by the user is also the same as the operation when the "select folder" button 2b is pressed upon the screen for image selection shown in FIG. 2, accordingly explanation thereof will be omitted.

The user selects from among the images displayed in the image display region 28a one or more images that he desires to replay when the slide show is played, and presses the "play slide show" button 28c. Here it will be supposed that, for example, the five images 28d through 28h have been chosen. When the "play slide show" button 28c is pressed by the user, the display control unit 103a displays upon the monitor 105 the layout selection screen shown in FIG. 29. This layout selection screen includes a number of images selection region 29a, a check box 29b for designating the method by which the images are to be sent, an image size selection button 29c, an "OK" button 29d, and a "cancel" button 20e.

The user selects how many images should be displayed upon one screen while the slide show is being played, by selecting the number of images to be displayed within the number of images selection region 29a. It should be understood that "pattern 1" and "pattern 2" shown in parentheses after the numbers of images, indicate patterns for arrangement of the images upon one screen. For example, in the case of two images, it may be arranged, when "pattern 1" is selected, for the two images to be arranged one above the other, while, when "pattern 2" is selected, the two images are shown beside one another.

Furthermore, by putting a check into the check box 29b, the user is able to designate for the images to be sent one at a time. If no check is thus put into the check box 29b, then the images are changed over between each screen. It should be understood that the difference between the result of playing the slide show in the case when a check is put into this check box 29b, and the result in the case when no such check is put in, will be described hereinafter with reference to FIGS. 30 through 33. Moreover, the user is also able to select the size for the images displayed upon each screen from among "large", "medium", and "small" with the image size selection button 29c, in a similar manner to the case with the first and second embodiments described above.

After the user has performed setting of a layout for when playing the slide show by the selection operation described above, he commands the slide show to be played by pressing the "OK" button 29d. Moreover, if the user has pressed the "cancel" button 20e, the display returns to the screen for slide show image selection shown in FIG. 28. When the user commands the slide show to be played, the slide show creation section creates a slide show image upon which the images are arranged by applying the optimum template, according to the orientations of the images that were selected with the screen for slide show image selection, and according to the state of selection with the layout selection screen. It should be understood that one slide show image corresponds to one screen while the slide show is being played.

Figure 30:
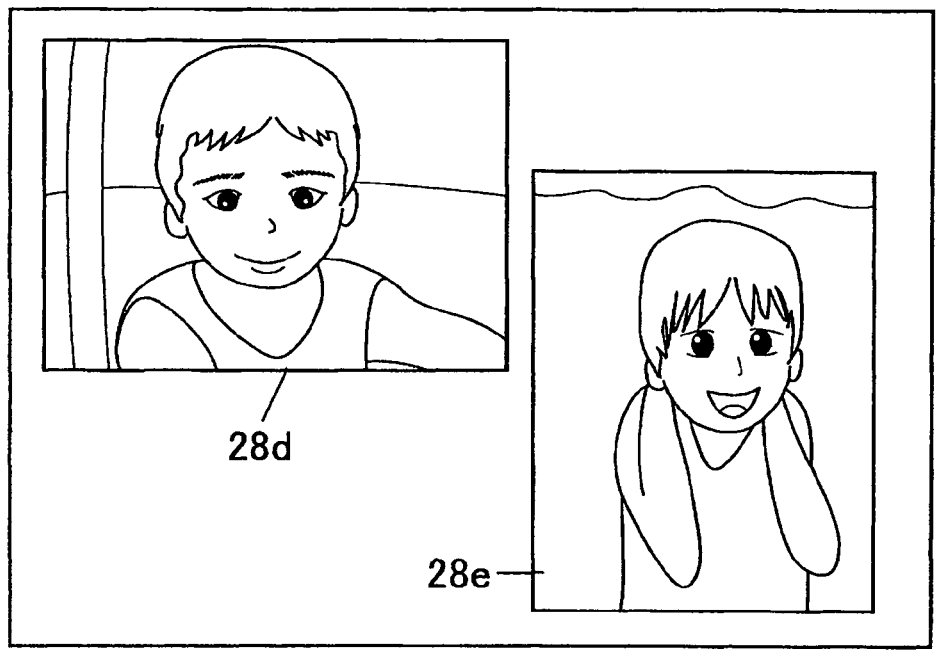
FIG. 30 is a first figure showing a concrete example of slide show images, in this variant embodiment (1)

In concrete terms, the slide show creation section determines a template set to be read in from the HDD 104, on the basis of the number of images to be arranged on one screen and the sizes of the images, as designated by the user. And, from this template set that has been read in, the slide show creation section selects a template to be applied for creating a slide show image, on the basis of the orientations of the images to be arranged in that slide show image. For example, when two images are designated to be arranged upon one screen, and when the landscape image 28d and the portrait image 28e are to be arranged upon the first slide show image, then the template 2-HV is selected and applied. Due to this, the slide show image creation section creates a first slide show image as shown in FIG. 30. In this first slide show image, the landscape image 28d is arranged as the first image, and the portrait image 28e is arranged as the second image.

Figure 31:
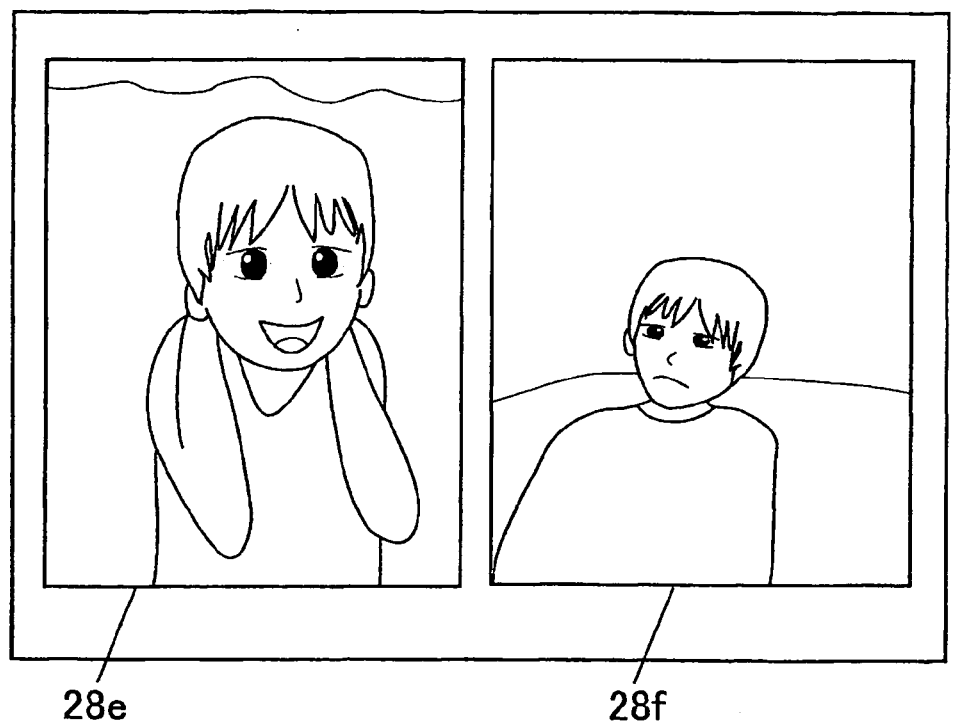
FIG. 31 is a second figure showing a concrete example of figure showing a concrete example of slide show images, in this variant embodiment (1)

And, the images to be arranged are different for the second and subsequent slide show images, depending upon the state of the check box 29b. In other words, if a check is put into the check box 29, so that it is designated for the slide show to be played while sending the images one at a time, then the slide show image creation section shifts the image that was arranged as the second in the slide show image that was created one before to be the first image, and arranges a new image (the third image) in the second space that has thus been vacated. For example, the slide show image creation section creates a second slide show image as shown in FIG. 31. In this second slide show image, the portrait image 28e is arranged as the first image, and the portrait image 28f is arranged as the second image.

Figure 32:
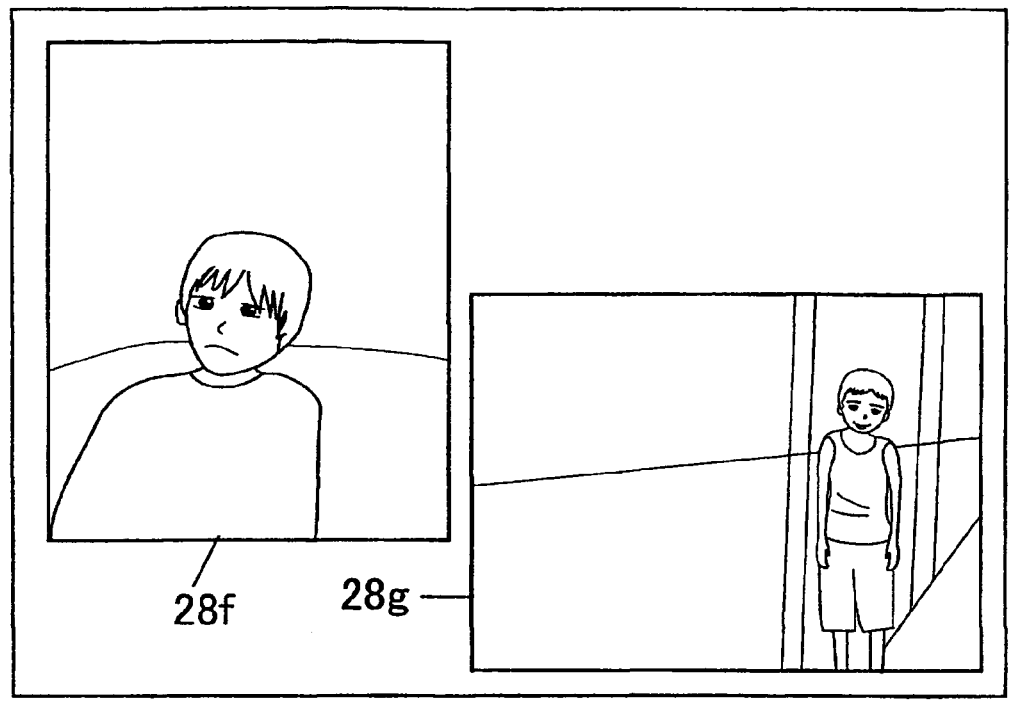
FIG. 32 is a third figure showing a concrete example of slide show images, in this variant embodiment (1)
Figure 33:
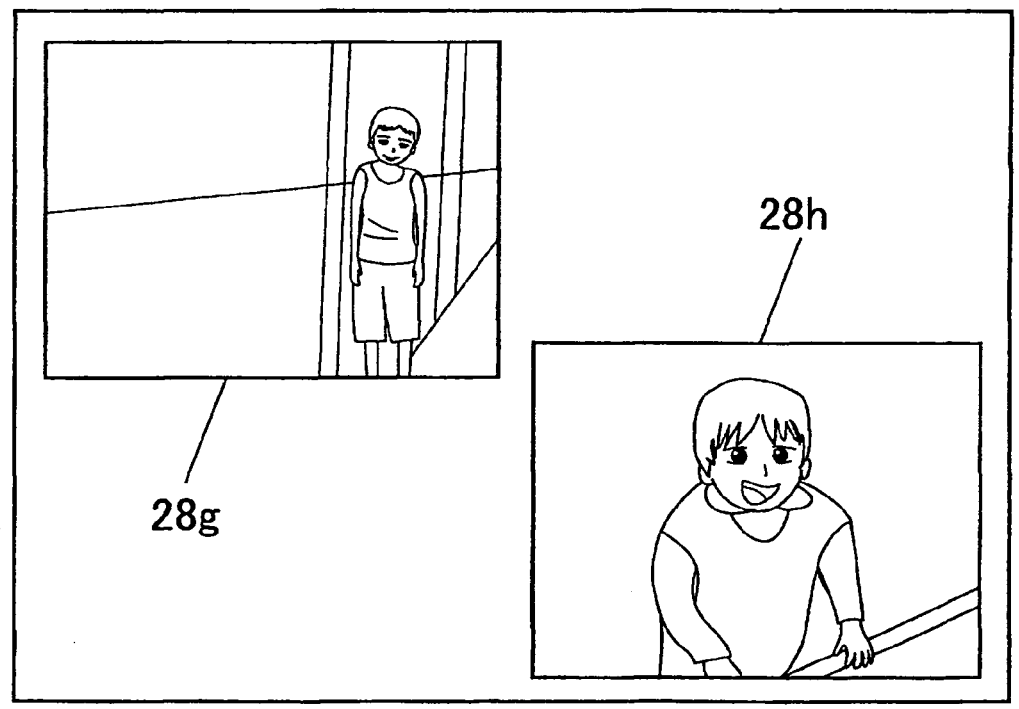
FIG. 33 is a fourth figure showing a concrete example of slide show images, in this variant embodiment (1)

And in a similar manner, as shown in FIG. 32, the slide show image creation section creates a third slide show image by applying the template 2-VH, and by arranging the portrait image 28f as the first image and the landscape image 28g as the second image. Furthermore, as shown in FIG. 33, it creates a fourth slide show image by applying the template 2-HH, and by arranging the landscape image 28g as the first image and the landscape image 28h as the second image.

By contrast, if no check is put into the check box 29b, then, after having created the first slide show image shown in FIG.

30, the slide show image creation section creates the slide show image shown in FIG. 32 as a second slide show image. Moreover, as a third slide show image, it creates a slide show image in which only the landscape image 28h is arranged. In other words, it does not advance between the slide show images by one shot at a time, but rather replaces all of the images included in the slide show image for each screen.

And the display control section 103a plays the slide show by outputting the slide show images created by the slide show image creation section in order to the monitor 105 at predetermined intervals. By doing this, it is possible to play a slide show of the images selected by the user arranged in the layout selected by the user, so that it is possible to broaden the scope of application of the present invention.

(2) In the first and second embodiments described above, cases have been explained in which the landscape images and the portrait images were images whose horizontal to vertical ratio was 4:3 and 3:4 respectively, so that there were two possibilities for this image aspect ratio. Due to this, it was sufficient to create a template set including all combinations for arranging images having these two aspect ratios. However, if for example the landscape images include images having a horizontal to vertical ratio of 4:3 and also images having a ratio of 3:2, while the portrait images include images having a horizontal to vertical ratio of 3:4 and also images having a ratio of 2:3, or the like, then it is necessary to prepare a template set that can deal with all of these aspect ratios (i.e. in which each and every one of the aspect ratios is taken into account). In this type of case, it will be sufficient to use the template set shown in FIG. 7 for 4:3 (or 3:4), and also, separately, to prepare and store a template set for 3:2 (or 2:3). Moreover, it would also be acceptable to prepare and store a template set in which image of different aspect ratios can be arranged within a single template. By doing this, it becomes possible to create albums whose subjects are images having various different aspect ratios.

(3) In the embodiments described above, examples have been explained in which, for example, a personal computer is used as the image display device 100. However, the present invention can also be applied to a device of some other type, such as, for example, a digital camera or a digital video camera, provided that it is capable of acquiring and recording an image, and provided that it incorporates a display device.

Figure 34:
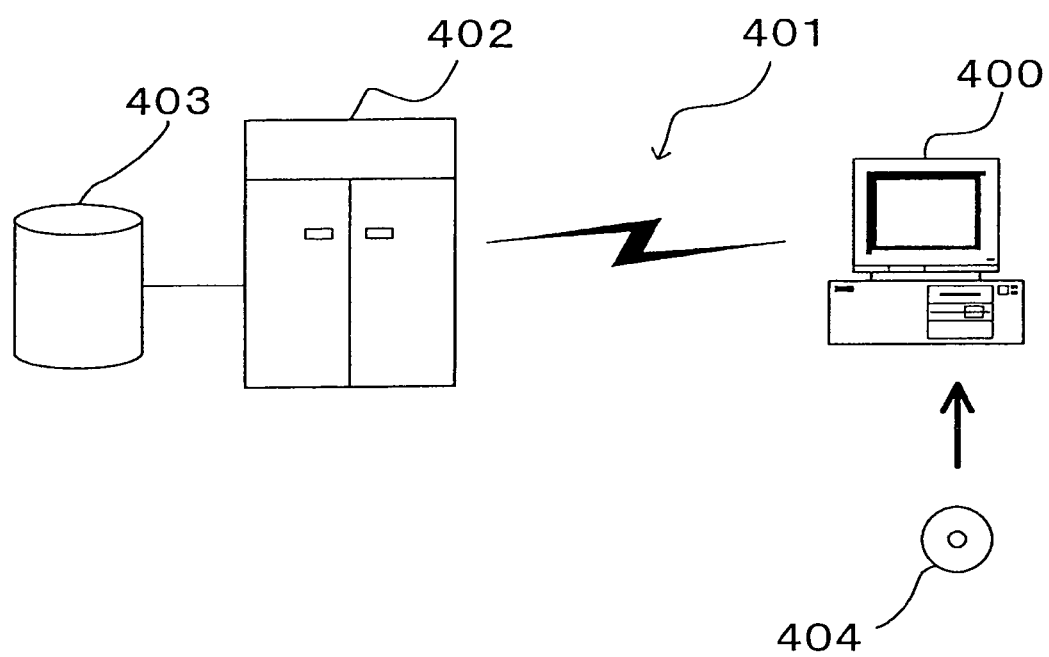
FIG. 34 is a figure showing a situation in which a program is supplied to a personal computer.

(4) Moreover, in the case of application to a personal computer or the like, the above described photographic subject tracking program may also be supplied via a recording medium such as a CD-ROM or the like, or via a data signal such as the internet or the like. FIG. 34 is a figure showing this situation. The personal computer 400 receives supply of the program via a CD-ROM 404. Moreover, the personal computer 400 is endowed with a function of connection to a communication circuit 401. A computer 402 is a server computer that supplies the program described above, and stores this program upon a recording medium such as a hard disk 403 or the like. The communication line 401 is the internet, a communication line such as a personal computer connection, or a dedicated communication line or the like. The computer 402 reads out the program using the hard disk 403, and transmits the program via the communication line 401 to the personal computer 400. In other words, the program is embodied in a carrier wave that serves as a data signal, and is transmitted via the communication line 401. In this manner, the program may be supplied as a computer-readable computer program product in various formats, such as a recording medium or a carrier wave or the like.

While various embodiments and variant embodiments have been explained in the above description, the present invention is not to be considered as being limited by the details thereof. Various other forms that may be considered to fall within the range of the technical concept of the present invention are also included within the scope of the present invention.

The disclosure of the following priority application is herein incorporated by reference: Japanese Patent Application No. 2007-079155 (filed on Mar. 26, 2007).

The invention claimed is:

1. An image display device, comprising:
a storage unit that stores a plurality of templates for image arrangement, each of the plurality of templates includes at least one of a portrait format arrangement region for arranging a portrait format image, and a landscape format image arrangement region for arranging a landscape format image;
a number of images to be arranged setting unit that sets a number of arrangement subject images (i.e. a number of images to be arranged) to be arranged within the plurality of templates for image arrangement;
a number of images to be arranged change unit that changes the number of images to be arranged set by the number of images to be arranged setting unit;
an image selection unit that selects the arrangement subject images from among photographic images that have been photographed in advance;
a decision unit that makes a decision whether orientations of the arrangement subject images selected by the image selection unit are in a portrait format or a landscape format;
a template selection unit that selects a template for image arrangement, as a subject template to be used for arranging the arrangement subject images, from among the plurality of templates for image arrangement stored in the storage unit, based on the number of images to be arranged set by the number of images to be arranged setting unit, and based on the decision by the decision unit;
a creation unit that creates an image for display by arranging the arrangement subject images in the image arrangement regions within the subject template selected by the template selection unit; and
a display control unit that displays the image for display created by the creation unit upon a display device, wherein
if the number of images to be arranged change unit changes to reduce a number of images to be arranged, the template selection unit changes a selection of the template to arrange the images being shifted forward in order, and if the number of images to be arranged change unit changes to increase a number of images to be arranged, the template selection unit changes a selection of the template to arrange the images being shifted backward in order.

2. The image display device according to claim 1, wherein, for each template set of the plurality of templates, the storage unit stores the templates for image arrangement grouped together with the templates for which the number of the image arrangement regions included in the template is the same being in one set.

3. The image display device according to claim 1, further comprising:
a replacement image selection unit that selects a replacement image to be replaced for one of the arrangement subject images arranged in the image for display, from among those of the photographic images that are not arranged in the image for display (i.e. from among the not yet arranged images), wherein the template selection unit reselects the subject template from among the subject template set, based on an orientation of the replacement image selected by the replacement images selection unit; and the creation unit recreates the image for display by arranging the replacement image in the image arrangement region within the subject template reselected by the template selection unit.

4. The image display device according to claim 1, wherein each template set of the plurality of templates is grouped together while also taking into account aspect ratios of the image arrangement regions.

5. The image display device according to claim 1, wherein each template set of the plurality of templates is grouped together while also taking into account sizes of the image arrangement regions.

6. The image display device according to claim 1, wherein the display control unit displays the images for display created by the creation unit upon the display device two at a time, side by side on left and right, in a double page spread format.

7. The image display device according to claim 1, wherein the image for display is an image showing a page included in an electronic album, or a slide show image displayed while playing a slide show.

8. The image display device according to claim 3, wherein the display control unit displays upon the display device a screen that is divided into a first region for displaying the images for display, a second region for displaying an item to be operated by a user for receiving change of the number of images to be arranged, and a third region for displaying the not yet arranged images.

9. The image display device according to claim 8, further comprising:

an image for display selection unit that selects the images for display, displayed in the first region, wherein the display control unit displays in the third region, as the not yet arranged images, only the photographic images whose orientations match those of the arrangement subject images arranged within the image for display selected by the image for display selection unit.

10. An image display device, comprising:

a storage unit that stores a plurality of templates for image arrangement, each of the plurality of templates includes at least one of a portrait format arrangement region for arranging a portrait format image, and a landscape format image arrangement region for arranging a landscape format image;

a number of images to be arranged setting unit that sets a number of arrangement subject images (i.e. a number of images to be arranged) to be arranged within the plurality of templates for image arrangement, and orientations of the arrangement subject images;

a number of images to be arranged change unit that changes the number of images to be arranged set by the number of images to be arranged setting unit;

an image selection unit that selects the arrangement subject images from among photographic images that have been photographed in advance;

a decision unit that makes a decision whether the orientations of the arrangement subject images selected by the image selection unit are in a portrait format or a landscape format;

a template selection unit that selects a template for image arrangement, as a subject template to be used for arranging the arrangement subject images, from among the plurality of templates for image arrangement stored in the storage unit, based on the number of images to be arranged and the orientations, set by the number of images to be arranged setting unit;

a creation unit that creates an image for display by arranging, within the image arrangement regions in the subject template selected by the template selection unit, the arrangement subject images whose orientations match, based on the decision by the decision unit; and a display control unit that displays the image for display created by the creation unit upon a display device, wherein if the number of images to be arranged change unit changes to reduce a number of images to be arranged, the template selection unit changes a selection of the template to arrange the images being shifted forward in order, and if the number of images to be arranged change unit changes to increase a number of images to be arranged, the template selection unit changes a selection of the template to arrange the images being shifted backward in order.

11. A computer program product for image display that stores, in a non-transitory computer-readable storage medium, a program for image display for causing a computer to execute:

a number of images to be arranged setting step of setting a number of arrangement subject images (i.e. a number of images to be arranged) to be arranged within a plurality of templates for image arrangement, each of the plurality of templates includes at least one of a portrait format arrangement region for arranging a portrait format image, and a landscape format image arrangement region for arranging a landscape format image;

a number of images to be arranged changing step of changing the number of images to be arranged set by the number of images to be arranged setting step:

an image selection step of selecting the arrangement subject images from among photographic images that have been photographed in advance;

a decision step of making a decision whether orientations of the arrangement subject images selected by the image selection step are in a portrait format or a landscape format;

a template selection step of selecting a template for image arrangement, as a subject template to be used for arranging the arrangement subject images, from among the plurality of templates for image arrangement, based on of the number of images to be arranged set by the number of images to be arranged setting step, and based on the decision by the decision step;

a creation step of creating an image for display by arranging the arrangement subject images in the image arrangement regions within the subject template selected by the template selection step;

a display control step of displaying the image for display created by the creation step upon a display device; and a template selection changing step of changing a selection of the template, to arrange the images being shifted forward in order if the number of images to be arranged changing step changes to reduce a number of images to be arranged, and to arrange the images being shifted backward in order if the number of images to be arranged changing step changes to increase a number of images to be arranged.

12. A computer program product for image display that stores, in a non-transitory computer-readable storage medium, a program for image display for causing a computer to execute:
- a number of images to be arranged setting step of setting a number of arrangement subject images (i.e. a number of images to be arranged) to be arranged within a plurality of templates for image arrangement, each of the plurality of templates includes at least one of a portrait format arrangement region for arranging a portrait format image, and a landscape format image arrangement region for arranging a landscape format image, and setting orientations of the arrangement subject images;
- a number of images to be arranged changing step of changing the number of images to be arranged set by the number of images to be arranged setting step;
- an image selection step of selecting the arrangement subject images from among photographic images that have been photographed in advance;
- a decision step of making, a decision whether the orientations of the arrangement subject images selected by the image selection step are portrait format or landscape format;
- a template selection step of selecting a template for image arrangement, as a subject template to be used for arranging the arrangement subject images, from among the plurality of templates for image arrangement, based on the number of images to be arranged set by the number of images to be arranged setting step, and based on the orientations of the arrangement subject images;
- a creation step of creating an image for display by arranging, within the image arrangement regions in the subject template selected by the template selection step, the arrangement subject images whose orientations match, based on decision results by the decision step;
- a display control step of displaying the image for display created by the creation step upon a display device; and
- a template selection changing step of changing a selection of the template, to arrange the images being shifted forward in order if the number of images to be arranged changing step changes to reduce a number of images to be arranged, and to arrange the images being shifted backward in order if the number of images to be arranged changing step changes to increase a number of images to be arranged.

* * * * *